United States Patent
Ito

(10) Patent No.: US 9,702,770 B2
(45) Date of Patent: Jul. 11, 2017

(54) SIGNAL COMPENSATION UNIT, BEND SENSOR MODULE, AND INPUT UNIT

(71) Applicant: Sony Corporation, Tokyo (JP)

(72) Inventor: Osamu Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 152 days.

(21) Appl. No.: 14/293,499

(22) Filed: Jun. 2, 2014

(65) Prior Publication Data
US 2014/0366636 A1 Dec. 18, 2014

(30) Foreign Application Priority Data

Jun. 12, 2013 (JP) ................................ 2013-124006

(51) Int. Cl.
| | | |
|---|---|---|
| *G01L 1/00* | (2006.01) | |
| *G01P 15/00* | (2006.01) | |
| *H03F 1/26* | (2006.01) | |

(52) U.S. Cl.
CPC .................................... *G01L 1/005* (2013.01)

(58) Field of Classification Search
CPC ........ G01L 1/005; H02N 13/00; H02N 11/00; H01J 40/14; G01P 15/14

USPC .................. 73/765, 862.337, 504.02, 514.32
See application file for complete search history.

(56) References Cited

U.S. PATENT DOCUMENTS

| | | | | |
|---|---|---|---|---|
| 7,187,160 B2* | 3/2007 | Higgins | ................. | G01R 19/03 324/76.11 |
| 2004/0233090 A1* | 11/2004 | Miyasita | ............... | H04L 25/062 341/155 |
| 2014/0144229 A1* | 5/2014 | Maejima | ............. | H03F 3/45183 73/504.02 |

FOREIGN PATENT DOCUMENTS

JP 2007-318960 12/2007

* cited by examiner

*Primary Examiner* — Harshad R Patel
*Assistant Examiner* — Brandi Hopkins
(74) *Attorney, Agent, or Firm* — K&L Gates LLP

(57) ABSTRACT

A signal compensation unit includes an adjustment section configured to adjust temporal variation characteristics of a detection signal obtained by a bend sensor. The adjustment section includes: a signal amplifier including a positive input terminal, a negative input terminal, and an output terminal, and amplifying the detection signal; and a resistor for adjustment of the temporal variation characteristics disposed between the positive input terminal and the negative input terminal of the signal amplifier.

22 Claims, 21 Drawing Sheets

SIGNAL COMPENSATION UNIT, BEND SENSOR MODULE, AND INPUT UNIT

CROSS REFERENCES TO RELATED APPLICATIONS

The present application claims priority to Japanese Priority Patent Application JP 2013-124006 filed in the Japan Patent Office on Jun. 12, 2013, the entire content of which is hereby incorporated by reference.

BACKGROUND

The present disclosure relates to a signal compensation unit configured to perform compensation of a detection signal obtained by a bend sensor such as a polymer sensor, and a bend sensor module and an input unit each including such a signal compensation unit.

Various bend sensors have been proposed in the past. Such bend sensors are each a sensor configured to generate a voltage (detection signal) corresponding to deformation (bending displacement) due to externally applied force. Examples of such bend sensors may include a polymer sensor (for example, Japanese Unexamined Patent Application Publication No. 2007-318960). The polymer sensor has a structure where a polymer layer (an ion exchange resin film or the like) is sandwiched between a pair of electrode layers.

SUMMARY

In such bend sensors such as a polymer sensor, it is in general expected to appropriately compensate a detection signal without using a complicated method to improve detection accuracy. It is therefore desired to propose a simple method that allows detection accuracy to be improved.

It is desirable to provide a signal compensation unit, a bend sensor module, and an input unit capable of improving detection accuracy by a simple method.

According to an embodiment of the present disclosure, there is provided a signal compensation unit, including an adjustment section configured to adjust temporal variation characteristics of a detection signal obtained by a bend sensor, wherein the adjustment section includes: a signal amplifier including a positive input terminal, a negative input terminal, and an output terminal, and amplifying the detection signal; and a resistor for adjustment of the temporal variation characteristics disposed between the positive input terminal and the negative input terminal of the signal amplifier. The meaning of "amplification" of a signal by the above-described "signal amplifier" is not limited to a case of literal amplification (gain>X1), but includes a case of gain=X1, and the same holds true hereinafter.

According to an embodiment of the present disclosure, there is provided a bend sensor module, including: a bend sensor; and a signal compensation unit configured to compensate a detection signal obtained by the bend sensor, the signal compensation unit including an adjustment section configured to adjust temporal variation characteristics of the detection signal, wherein the adjustment section includes a signal amplifier including a positive input terminal, a negative input terminal, and an output terminal, and amplifying the detection signal, and a resistor for adjustment of the temporal variation characteristics disposed between the positive input terminal and the negative input terminal of the signal amplifier.

According to an embodiment of the present disclosure, there is provided an input unit, including: a bend sensor module including a bend sensor; and a signal compensation unit configured to compensate a detection signal obtained by the bend sensor, the signal compensation unit including an adjustment section configured to adjust temporal variation characteristics of the detection signal, wherein the adjustment section includes a signal amplifier including a positive input terminal, a negative input terminal, and an output terminal, and amplifying the detection signal, and a resistor for adjustment of the temporal variation characteristics disposed between the positive input terminal and the negative input terminal of the signal amplifier.

In the signal compensation unit, the bend sensor module, and the input unit according to the above-described respective embodiments of the present disclosure, the resistor for adjustment of the temporal variation characteristics of the detection signal is disposed between the positive input terminal and the negative input terminal of the signal amplifier configured to amplify the detection signal obtained by the bend sensor. Consequently, the temporal variation characteristics are easily compensated in a simple and appropriate manner during compensation of the detection signal subjected to such adjustment.

According to the signal compensation unit, the bend sensor module, and the input unit of the above-described respective embodiments of the present disclosure, the resistor for adjustment of the temporal variation characteristics of the detection signal is disposed between the positive input terminal and the negative input terminal of the signal amplifier; hence, it is possible to easily compensate the temporal variation characteristics in a simple and appropriate manner. Consequently, it is possible to improve detection accuracy by a simple method.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the present disclosure will be described in detail with reference to the accompanying drawings. It is to be noted that description is made in the following order.

1. First embodiment (an example of compensation processing of suppressing attenuation characteristics while an output value is held).

2. Second embodiment (an example of compensation processing of suppressing the attenuation characteristics through cumulative addition operation using attenuation amount information).

3. Modification of second embodiment

Modifications 1 and 2 (an exemplary case where a plurality of types of attenuation amount information are switched in correspondence to a compensation area).

4. Third embodiment (an exemplary case where compensation processing of the first embodiment and compensation processing of the second embodiment are performed in a parallel manner).

5. Fourth embodiment (an exemplary case where compensation processing of the first embodiment and compensation processing of the second embodiment are performed in series).

6. Fifth embodiment (an example of compensation processing of suppressing attenuation characteristics using waveform equalization processing).

7. Modifications common to the first to fifth embodiments.

Modifications 3 and 7 (other exemplary layout configurations of a resistor for adjustment of temporal variation characteristics in an adjustment section).

8. Application example (an application example of the polymer sensor module to an input unit and an electronic apparatus).

9. Other Modifications.

First Embodiment

[Configuration of Polymer Sensor Module 1]

Figure 1:
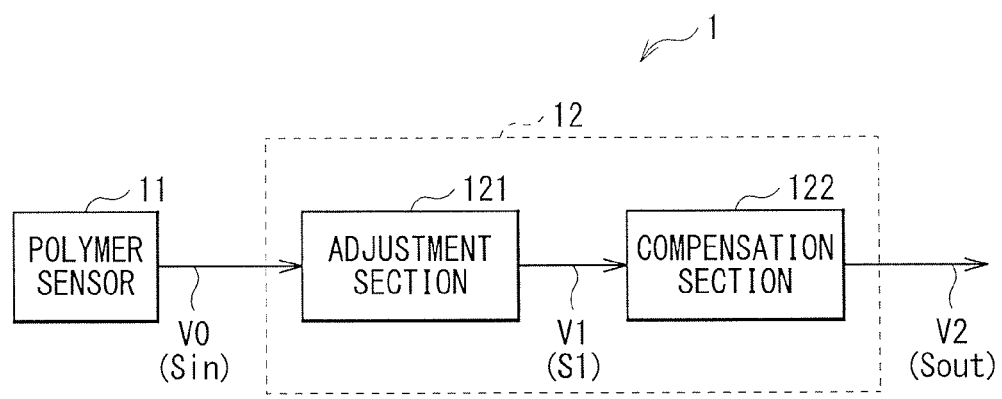
FIG. 1 is a block diagram illustrating an exemplary configuration of a polymer sensor module according to a first embodiment of the present disclosure.

FIG. 1 is a block diagram illustrating an exemplary schematic configuration of a bend sensor module (polymer sensor module 1) according to a first embodiment of the present disclosure. The polymer sensor module 1 includes a polymer sensor 11 (bend sensor) and a signal compensation unit 12.

(Polymer Sensor 11)

The polymer sensor 11 is a sensor that generates a voltage (detection voltage $V0$, or detection signal $S_{in}$) corresponding to deformation (bending displacement) due to externally applied force, and corresponds to one specific example of "bend sensor" according to an example embodiment of the present disclosure. It is possible to allow such a polymer sensor 11 to serve as a speed sensor or an acceleration sensor, for example.

Figure 2:
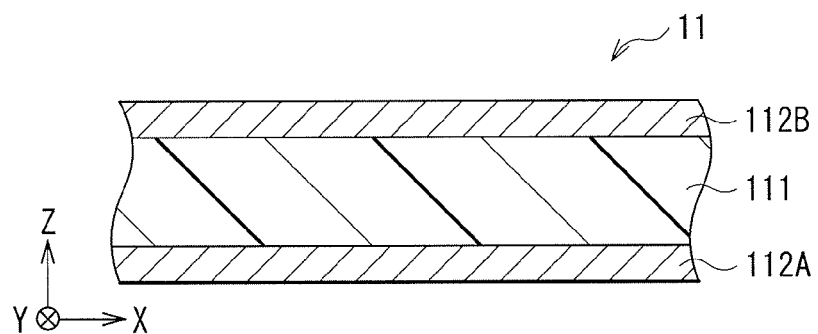
FIG. 2 is a sectional diagram illustrating a detailed exemplary configuration of a polymer sensor illustrated in FIG. 1.

FIG. 2 illustrates an exemplary sectional configuration (an exemplary configuration along a Z-X section) of a polymer sensor 11. The polymer sensor 11 has a stacked structure including a pair of electrode layers 112A and 112B disposed on two sides of a polymer layer 111. In other words, the polymer sensor 11 includes the pair of electrode layers 112A and 112B and the polymer layer 111 interposed between the electrode layers 112A and 112B. The periphery of such a polymer sensor 11 may be covered with an insulating protective film configured of a highly elastic material (for example, polyurethane).

For example, the polymer layer 111 may be configured of an ion-conductive polymer compound film impregnated with an ionic substance. Here, "ionic substance" refers to any of ions that are allowed to be conducted within the polymer layer 111. Specifically, the ionic substance refers to a hydrogen ion, a single metal ion, a substance containing such a cation and/or an anion and a polar solvent, or a liquid in itself containing a cation and/or an anion such as an imidazolium salt. Examples of the former may include a substance containing a cation and/or an anion solvated with a polar solvent, and examples of the latter may include an ionic liquid.

Examples of a material configuring the polymer layer 111 may include an ion exchange resin including fluorine resin, a hydrocarbon material, or the like as a skeleton. As the ion exchange resin, a cationic exchange resin is preferable when a cationic substance is impregnated, while an anionic exchange resin is preferable when an anionic substance is impregnated.

Examples of the cationic exchange resin may include a resin having an acidic group introduced therein, such as a sulfonate group, a carboxyl group, or the like. Specifically, the cationic exchange resin includes polyethylene having an acidic group, polystyrene having an acidic group, a fluorine resin having an acidic group, and the like. In particular, the cationic exchange resin preferably includes fluorine resin having a sulfonate group or a carboxylic group, for example, Nafion (from Du Pont Kabushiki Kaisha).

Any of cationic substances may be impregnated in the polymer layer 111 regardless of a type thereof such as an organic substance or an inorganic substance. For example, substances having various configurations such as a single metal ion, a substance containing a metal ion and water, a substance containing an organic cation and water, and an ionic liquid are usable. Examples of the metal ion may include light metal ions such as a sodium ion ($Na^+$), a potassium ion ($K^+$), a lithium ion ($Li^+$), and a magnesium ion ($Mg^{2+}$). Examples of the organic cation may include an alkyl ammonium ion and the like. Such cationic ions each exist as a hydrate in the polymer layer 111. Consequently, when a cationic substance containing a cation and water is impregnated in the polymer layer 111, the polymer sensor 11 as a whole is preferably sealed in order to suppress vaporization of water.

The ionic liquid may be referred to as ambient temperature molten salt, and contains a cation and an anion that are low in flammability and volatility. Examples of the ionic liquid may include imidazolium-ring compounds, pyridinium-ring compounds, aliphatic compounds, and the like.

In particular, the cationic substance is preferably configured of the ionic liquid. This is because since the ionic liquid is low in volatility, the polymer sensor 11 excellently operates even in a high-temperature atmosphere or in a vacuum.

The electrode layers 112A and 112B each contain one or more conductive materials. The electrode layers 112A and 112B each preferably include particles of conductive material powder bound to one another via an ion conductive polymer. This is because flexibility of each of the electrode layers 112A and 112B is increased thereby. Carbon powder is preferred as the conductive material powder. This is because carbon powder provides relatively large deformation amount due to its high conductivity and large specific surface. Ketjen black is preferable as the carbon powder. The ion conductive polymer is preferably similar to the above-described constitutional material of the polymer layer 111.

For example, the electrode layers 112A and 112B may be formed in the following manner. Specifically, a paint including the conductive material powder and the ion-conductive polymer that are dispersed in a dispersion medium is applied onto the two sides of the polymer layer 111, and is then dried. Alternatively, a film-like material containing the conductive material powder and the ion-conductive polymer may be pressure-bonded to the two sides of the polymer layer 111.

The electrode layers 112A and 112B may each have a multilayer structure. In such a case, each of the electrode layers 112A and 112B preferably has a structure where a layer including the particles of the conductive material powder bound to one another via the ion-conductive polymer and a metal layer are stacked in order of closeness to the polymer layer 111. This is because such a structure allows an electric potential to have a more uniform value in an in-plane direction of each of the electrode layers 112A and 112B, so that more excellent deformation performance is provided. Examples of a material configuring the metal layer may include noble metal such as gold and platinum. While the metal layer may have an appropriate thickness, the metal layer is preferably a continuous film so that each of the electrode layers 112A and 112B has a uniform electric potential. Examples of a process of forming the metal layer may include a plating process, an evaporation process, and a sputter process.

(Signal Compensation Unit 12)

As illustrated in FIG. 1, the signal compensation unit 12 is configured to compensate a detection voltage V0 (detection signal Sin) provided (output) from the polymer sensor 11, and output a compensated voltage V2 (compensated signal Sout) as the compensated detection voltage (detection signal). The signal compensation unit 12 includes an adjustment section 121 and a compensation section 122. Although the adjustment section 121 is configured using a circuit (hardware), and the compensation section 122 is configured using a program (software) in the following exemplary case, this is not limitative, and other configuration s may be used.

The adjustment section 121 is configured to adjust temporal variation characteristics (attenuation characteristics of a signal value described later) of the detection voltage V0 (detection signal Sin) received from the polymer sensor 11, and output an adjusted voltage V1 (adjusted signal S1) as a detection signal subjected to such adjustment.

Figure 3:
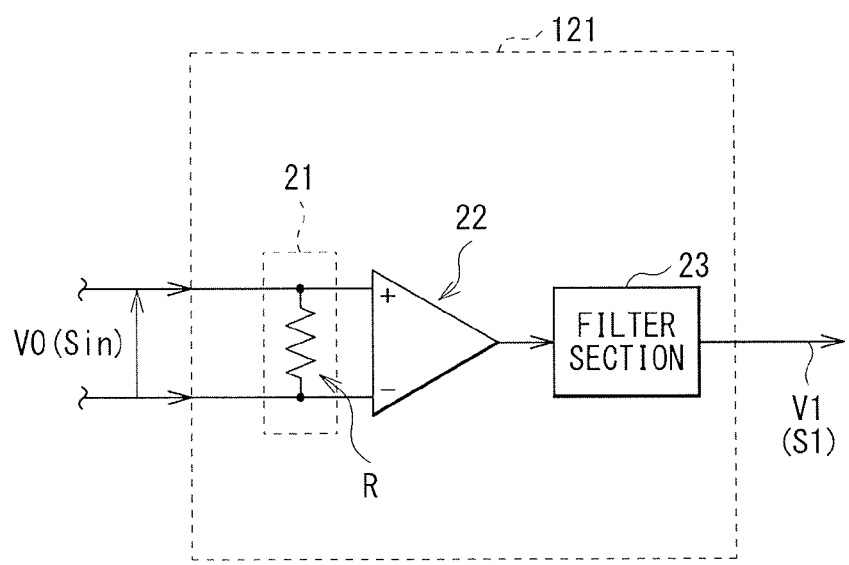
FIG. 3 is a circuit diagram illustrating a detailed exemplary configuration of an adjustment section illustrated in FIG. 1.

FIG. 3 is a circuit diagram illustrating a detailed exemplary configuration of the adjustment section 121. The adjustment section 121 includes an impedance adjustment section 21, a signal amplifier 22, and a filter section 23.

The impedance adjustment section 21 is a section configured to perform adjustment (impedance adjustment) for suppressing the temporal variation characteristics (attenuation characteristics) of the detection voltage V0 (detection signal Sin), and is configured of a resistor R. In this exemplary case, the resistor R is disposed between a positive input terminal and a negative input terminal of the signal amplifier 22. In other words, a first end of the resistor R is connected to a signal line for the detection signal Sin connected to the positive input terminal, and a second end of the resistor R is connected to a signal line for the detection signal Sin connected to the negative input terminal. As described in detail later, magnitude of impedance (a resistance value) of the resistor R is adjusted such that the temporal variation characteristics (attenuation characteristics) of the detection voltage V0 (detection signal Sin) are suppressed.

The signal amplifier 22 is an amplifier for performing amplification of the detection voltage V0 (detection signal Sin).

The filter section 23 is configured to perform predetermined filtering (for example, processing of selectively removing a noise component) on a signal output from the output terminal of the signal amplifier 22, and output the signal subjected to such filtering as the adjusted voltage V1 (adjusted signal S1).

The compensation section 122 illustrated in FIG. 1 is configured to output the compensated voltage V2 (compensated signal Sout) through performing predetermined signal compensation on the adjusted voltage V1 (adjusted signal S1) output from the adjustment section 121. As described in detail later, the compensation section 122 performs signal compensation on the adjusted signal S1 while separating between signal variation (first signal variation) in response to external input operation by a user and signal variation (second signal variation) due to the temporal variation characteristics (attenuation characteristics).

[Functions and Effects of Polymer Sensor Module 1]
(A. Operation of Polymer Sensor 11)

In the polymer sensor module 1 of the first embodiment, first, the polymer sensor 11 generates the detection voltage V0 (detection signal Sin) in the following manner. Specifically, when the polymer layer 111 of the polymer sensor 11 is deformed (curved) in a direction (in this exemplary case, a Z-axis direction) orthogonal to a thickness direction in accordance with deformation (bending displacement) due to externally applied force, a voltage (electromotive force) is induced between the electrode layer 112A and the electrode layer 112B according to the following principle.

Operation of the polymer sensor 11 is now described with reference to FIGS. 4A, 4B, and 4C while cases are distinguished depending on the above-described types of the cationic substances impregnated in the polymer layer 111.

First, description is made on a case of using a substance containing a cation and a polar solvent as the cationic substance.

In this case, first, for example, when the polymer sensor 11 itself does not move linearly nor rotationally and therefore no acceleration and no angular acceleration occur, the polymer sensor 11 receives no force due to such acceleration and angular acceleration. Hence, the polymer sensor 11 is not deformed (curved) and has a planar shape. The cationic substance is therefore dispersed substantially uniformly in the polymer layer 111; hence, no potential difference occurs between the electrode layers 112A and 112B, and the detection voltage V0 of the polymer sensor 11 is 0 (zero) V.

Figure 4A:
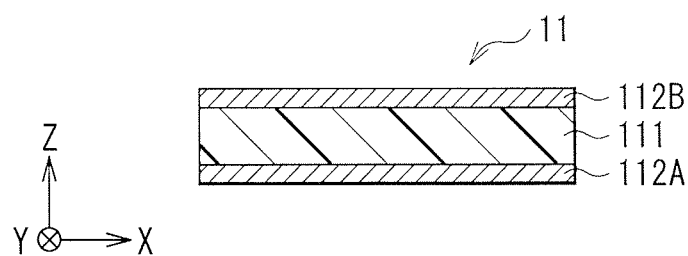
FIG. 4A is a schematic sectional diagram for explaining basic operation of a polymer sensor illustrated in FIG. 2.
Figure 4B:
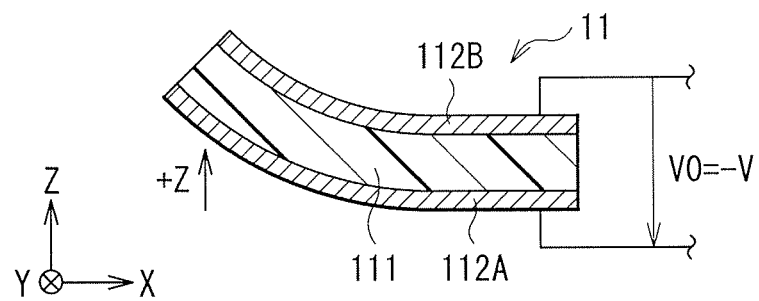
FIG. 4B is another schematic sectional diagram for explaining the basic operation of the polymer sensor illustrated in FIG. 2.
Figure 4C:
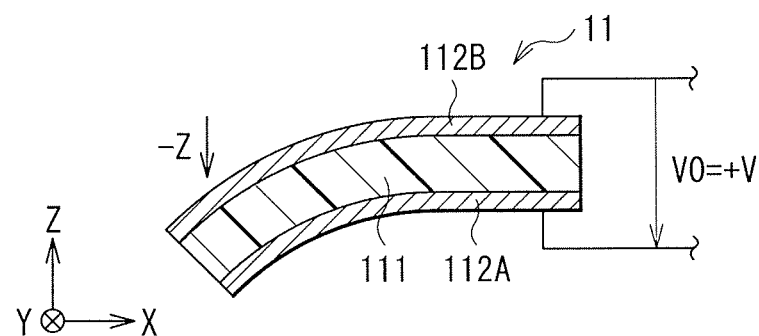
FIG. 4C is another schematic sectional diagram for explaining the basic operation of the polymer sensor illustrated in FIG. 2.

For example, when acceleration or angular acceleration may be caused by linear or rotational motion of the polymer sensor 11 itself, the polymer sensor 11 may receive force due to such acceleration or angular acceleration; hence, the polymer sensor 11 is deformed (curved) (FIGS. 4B and 4C).

For example, as illustrated in FIG. 4B, when the polymer sensor 11 is deformed in a positive direction (to an electrode layer 112B side) on a Z axis, the polymer layer 111 is contracted on the electrode layer 112B side while being swelled on an electrode layer 112A side. Cations are then moved to an electrode layer 112A side while solvating with a polar solvent. As a result, the cations become dense on the electrode layer 112A side, while becoming coarse on the electrode layer 112B side. Hence, in this case, the polymer sensor 11 generates a voltage V having a higher electric potential on the electrode layer 112A side than on the electrode layer 112B side. In other words, in this case, the detection voltage V0 of the polymer sensor 11 is a negative voltage (−V).

On the other hand, as illustrated in FIG. 4C, when the polymer sensor 11 is deformed in a negative direction (to an electrode layer 112A side) on the Z axis, the polymer layer 111 is conversely contracted on the electrode layer 112A side while being swelled on the electrode layer 112B side. The cations are then moved to an electrode layer 112B side while solvating with a polar solvent. As a result, the cations become dense on the electrode layer 112B side, while becoming coarse in an electrode layer 112A side. Hence, in this case, the polymer sensor 11 generates a voltage V having a higher electric potential on the electrode layer 112B side than on the electrode layer 112A side. In other words, in this case, the detection voltage V0 of the polymer sensor 11 is a positive voltage (+V).

Second, description is made on a case where the ionic liquid as a substance containing a liquid cation is used as the cationic substance.

Also in this case, first, for example, when the polymer sensor 11 itself does not move linearly nor rotationally and therefore no acceleration and no angular acceleration occur, the polymer sensor 11 is not deformed and in a planar state (FIG. 4A). The ionic liquid is therefore dispersed substantially uniformly in the polymer layer 111; hence, no potential difference occurs between the electrode layers 112A and 112B, and the detection voltage V0 of the polymer sensor 11 is 0 (zero) V.

For example, when acceleration or angular acceleration may be caused by linear or rotational motion of the polymer sensor 11 itself, the polymer sensor 11 is deformed as with the above-described case (FIGS. 4B and 4C).

For example, as illustrated in FIG. 4B, when the polymer sensor 11 is deformed in the positive direction (to the electrode layer 112B side) on the Z axis, the polymer layer 111 is contracted on the electrode layer 112B side while being swelled on the electrode layer 112A side. In the case where the polymer layer 111 is configured of a cation exchange film, cations configuring the ionic liquid are allowed to move through the film to the electrode layer 112A side, but anions are obstructed by functional groups and not movable. Hence, in this case, the polymer sensor 11 generates a voltage V having a higher electric potential on the electrode layer 112A side than on the electrode layer 112B side. In other words, also in this case, the detection voltage V0 of the polymer sensor 11 is a negative voltage (−V).

On the other hand, as illustrated in FIG. 4C, when the polymer sensor 11 is deformed in the negative direction (to the electrode layer 112A side) on the Z axis, the polymer layer 111 is conversely contracted on the electrode layer 112A side while being swelled on the electrode layer 112B side. According to a reason similar to that described above, the cations in the ionic liquid then move to the electrode layer 112B side. Hence, in this case, the polymer sensor 11 generates a voltage V having a higher electric potential on the electrode layer 112B side than on the electrode layer 112A side. In other words, also in this case, the detection voltage V0 of the polymer sensor 11 is a positive voltage (+V).

(B. Operation of Signal Compensation Unit 12)

Operation (compensation operation on the detection signal Sin) of the signal compensation unit 12 in the first embodiment is now described in detail with reference to FIGS. 1 to 3 and FIGS. 5 to 10.

(Summary of Compensation Operation)

Figure 5:
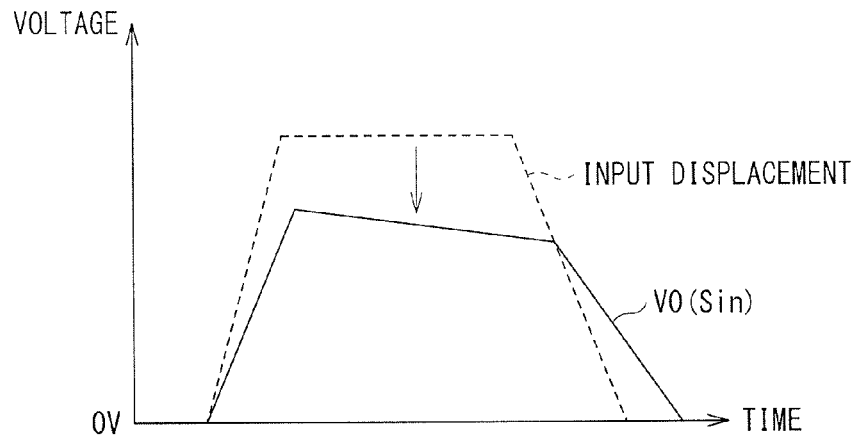
FIG. 5 is a timing waveform diagram for explaining attenuation characteristics of a detection signal.
Figure 6:
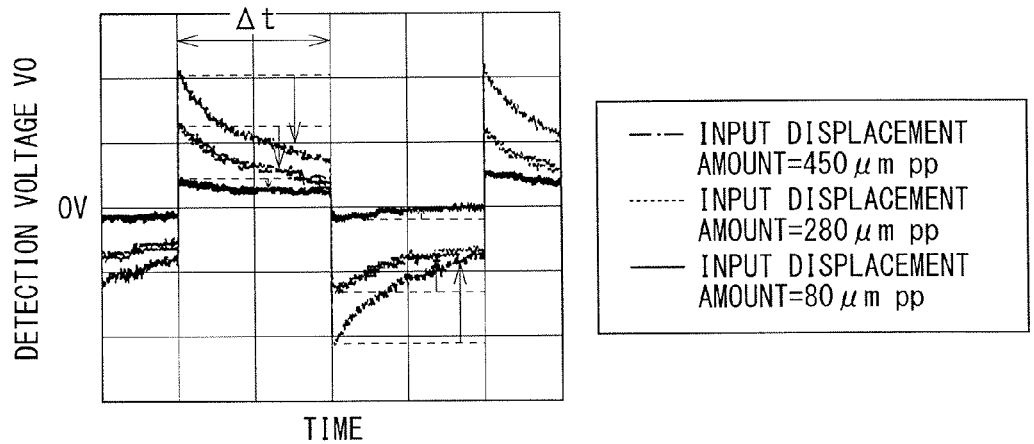
FIG. 6 is a timing waveform diagram illustrating an example of the detection signal.

First, for example, as illustrated by arrows in FIGS. 5 and 6, the detection voltage V0 (detection signal S0) output from the polymer sensor 11 may show a phenomenon (have a property) where a value thereof is attenuated with the lapse of time. Due to such temporal variation characteristics (attenuation characteristics), the polymer sensor is in general not suitable for observation of slow displacement or observation of displacement being held. This is because if the sensor output is attenuated independent of impressed displacement (input displacement), detection accuracy is reduced, and practice of desired measurement is difficult. Such attenuation characteristics may be particularly disadvantageous, for example, in the case of observation every 100 seconds (a case where Δt is about 100 sec in FIG. 6).

Figure 7:
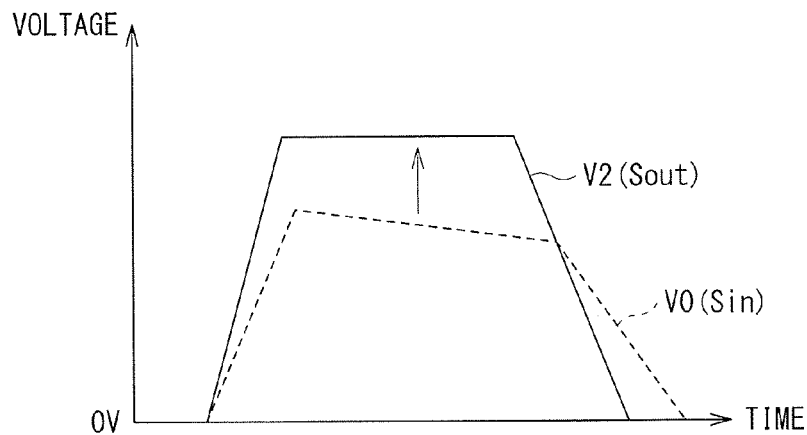
FIG. 7 is a timing waveform diagram for explaining compensation of the attenuation characteristics.

For example, as illustrated by an arrow in FIG. 7, the signal compensation unit 12 therefore compensates the detection voltage V0 (detection signal S0) such that such temporal variation characteristics (attenuation characteristics) are suppressed (desirably prevented), and generates the compensated voltage V2 (compensated signal Sout).

In such compensation, it is desirable to appropriately compensate the detection signal without using a complicated method to improve detection accuracy. In other words, it is desirable to propose a simple compensation method (with a simple configuration and realtime (fast) processing) that allows detection accuracy to be improved.

(Functions of Adjustment Section 121)

In the signal compensation unit 12, therefore, as illustrated in FIG. 3, the adjustment section 121 has the resistor R for adjustment of the temporal variation characteristics (attenuation characteristics) of the detection voltage V0 (detection signal Sin) between the positive input terminal and the negative input terminal of the signal amplifier 22. Specifically, magnitude of the impedance Z of the resistor R is adjusted such that the attenuation characteristics are suppressed. Consequently, when the detection signal (adjusted signal S1) subjected to such adjustment is compensated by the compensation section 122 in a subsequent stage, the attenuation characteristics are easily compensated in a simple and appropriate manner. In other words, matching of the adjusted signal S1 is made such that the adjusted signal S1 is suitable for compensation by the compensation section 122.

If a current flows through the resistor R disposed in such a manner, the value of the detection voltage V0 (detection signal Sin) is decreased. Hence, in general, the signal compensation unit 12 is in a high impedance (Hi-Z) state, and the resistor R is not provided in that position.

Figure 8:
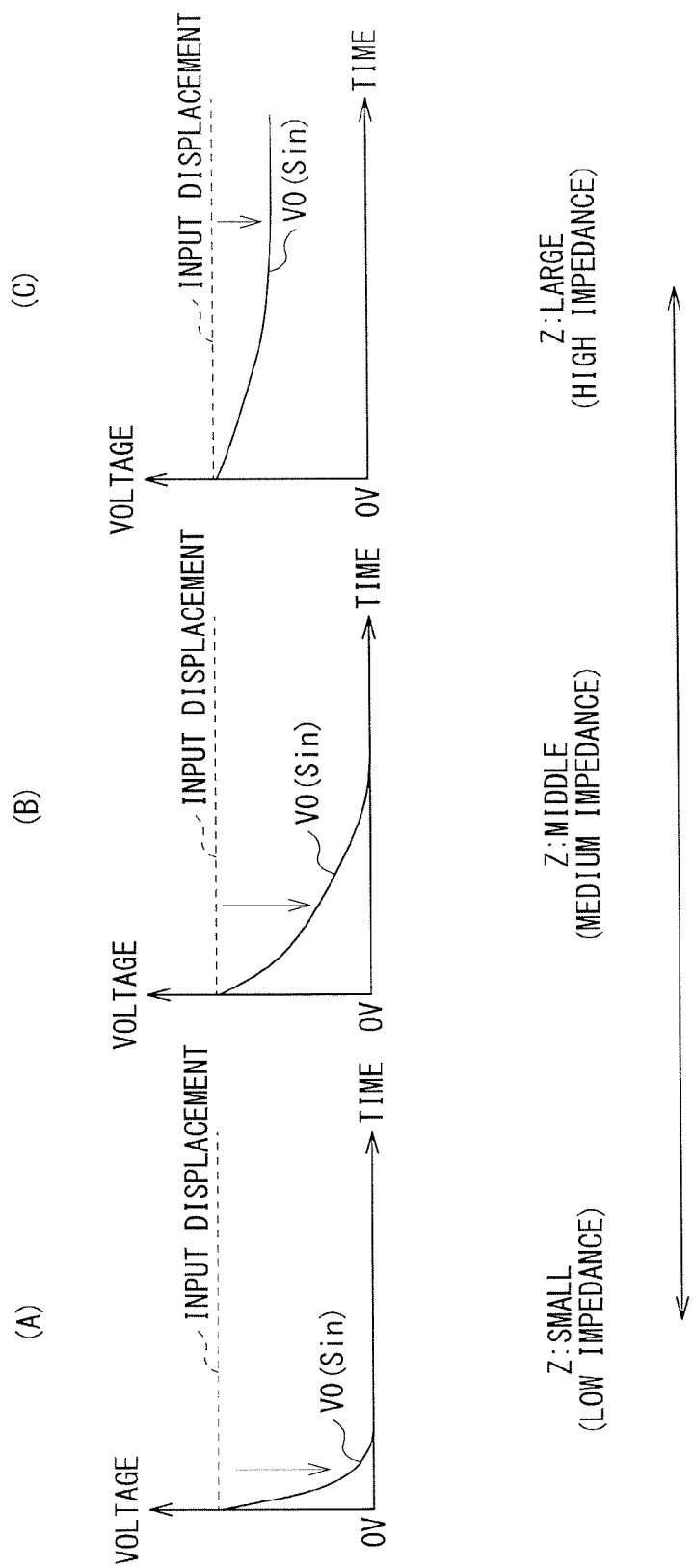
FIG. 8 is a schematic diagram for explaining a relationship between magnitude of impedance and a detection signal in the adjustment section.

For example, as illustrated in (A) to (C) of FIG. 8, as the impedance Z of the resistor R increases, the suppression degree of the attenuation characteristics of the detection voltage V0 (detection signal Sin) increases. In other words, as the impedance Z increases, an attenuation curve gradually becomes gentler. Hence, in light of the suppression degree of the attenuation characteristics (for example, in light of facilitating separation of signal variation as described later), it may be said that the value of the impedance Z is desirably as large as possible. Such an attenuation curve of the detection voltage V0 (detection signal Sin) is the same as that of an attenuation curve of the adjusted voltage V1 (adjusted signal S1) except for a difference in signal value associated with signal amplification, and the same holds true below.

However, if the impedance Z excessively increases, the transient response characteristics (through rate) of each of the detection voltage V0 (detection signal Sin) and the adjusted voltage V1 (adjusted signal S1) are degraded. In other words, unnecessarily high impedance has a harmful effect. Hence, it may be said that magnitude of the impedance Z is necessary to be adjusted in light of tradeoff with such a through rate.

(Operation of Compensation Section 122)

As described before, the compensation section 122 performs predetermined signal compensation on the adjusted voltage V1 (adjusted signal S1) output from the adjustment section 121, and generates the compensated voltage V2 (compensated signal Sout). The compensation section 122 performs signal compensation on the adjusted signal S1 while separating between signal variation (first signal variation) in response to external input operation by a user and signal variation (second signal variation) due to the attenuation characteristics.

Figure 9:
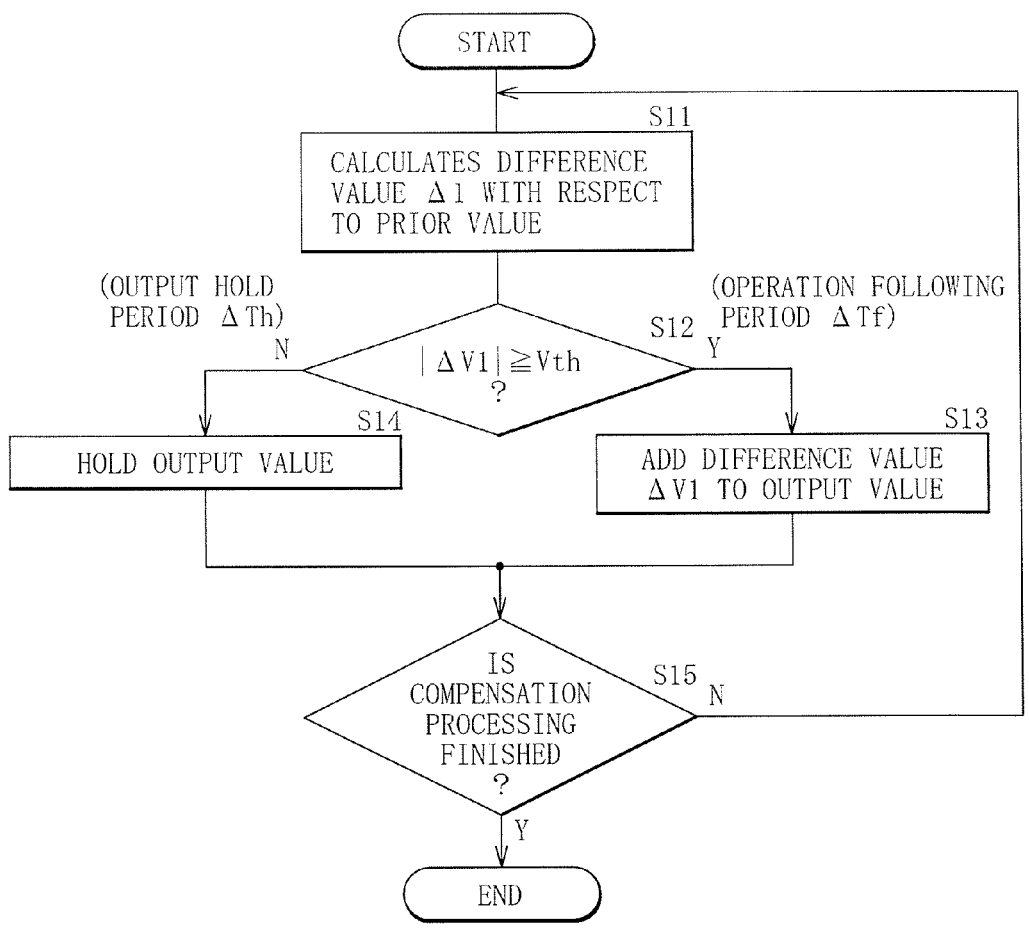
FIG. 9 is a flowchart illustrating exemplary compensation processing by a compensation section illustrated in FIG. 1.
Figure 10:
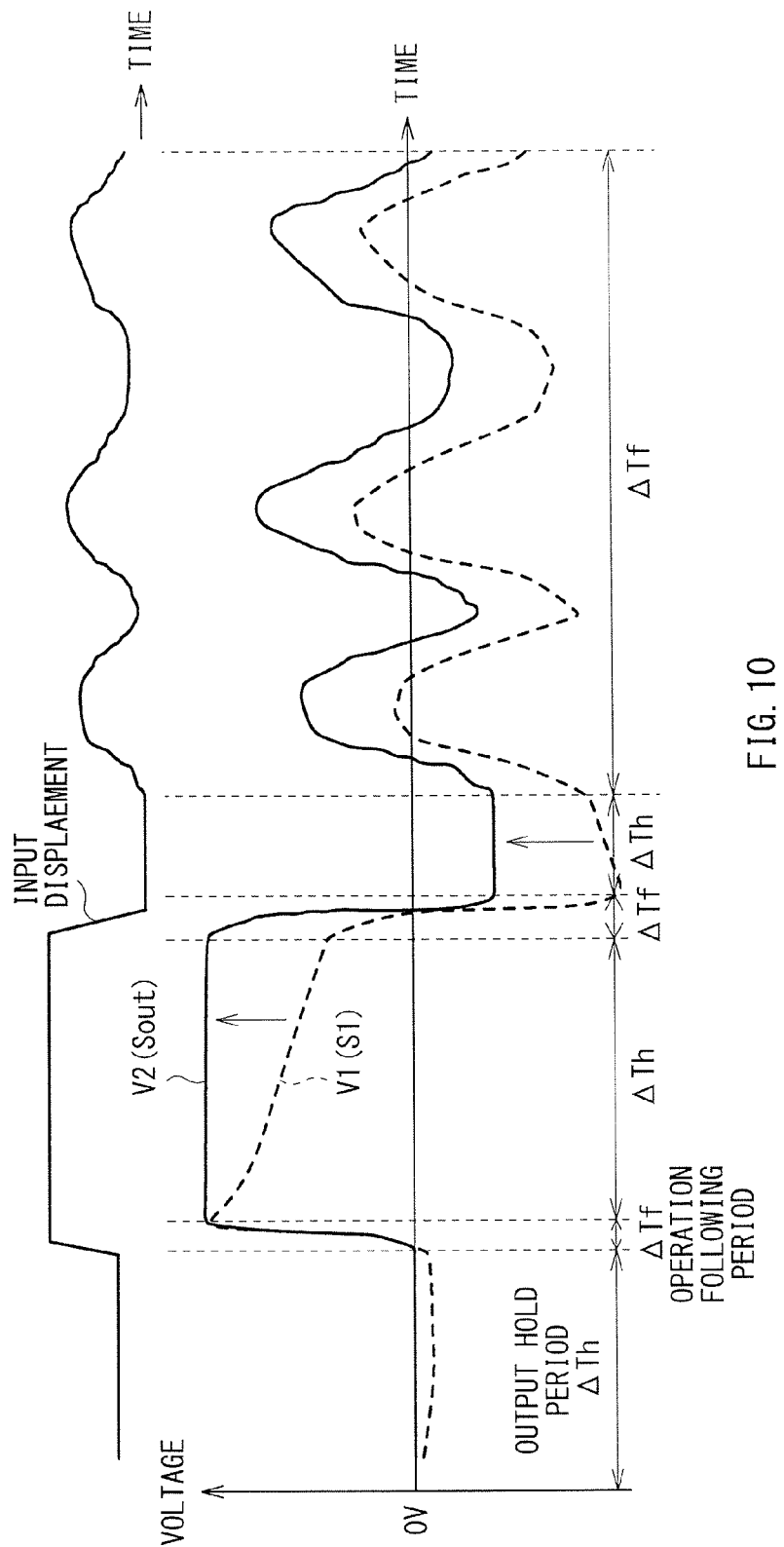
FIG. 10 is a timing waveform diagram for explaining a compensation method illustrated in FIG. 9.

FIG. 9 is a flowchart illustrating exemplary compensation processing of the compensation section 122. In this compensation processing, first, the compensation section 122 calculates a difference value ΔV1 (amount of signal variation per unit time) of the adjusted signal S1 with respect to a prior value (step S11). Subsequently, the compensation section 122 determines whether or not an absolute value |ΔV1| of the difference value ΔV1 is equal to or larger than a predetermined threshold Vth (|ΔV1|≥Vth) (step S12).

When the |ΔV1| is determined to be equal to or larger than the threshold Vth (|ΔV1|≥Vth) (step S12: Y), the compensation section 122 determines that the difference value ΔV1 (amount of signal variation) is caused by the signal variation (first signal variation) in response to external input operation by a user. Hence, in this case, the compensation section 122 performs signal compensation that allows the adjusted signal S1 to follow the signal variation in response to the external input operation, for example, as in an operation following period ΔTf in a timing waveform illustrated in FIG. 10. Specifically, the compensation section 122 adds the difference value ΔV1 to the adjusted voltage V1 (adjusted signal S1), thereby generates the compensated voltage V2 (compensated signal Sout) (step S13). After that, the process is advanced to step S15 described later.

On the other hand, when the |ΔV1| is determined to be smaller than the threshold Vth (|ΔV1|<Vth) (step S12: N), the compensation section 122 determines that the difference value ΔV1 (amount of signal variation) is caused by the signal variation (second signal variation) due to the attenuation characteristics. Hence, in this case, the compensation section 122 performs signal compensation that suppresses the attenuation characteristics of the adjusted voltage V1 (adjusted signal S1), for example, as in an output hold period ΔTh in FIG. 10. Specifically, the compensation section 122 performs signal compensation that allows an output value (a signal value) from the compensation section 122 to be held (fixed), thereby generates the compensated voltage V2 (compensated signal Sout) (step S14). In this way, the compensation processing in the first embodiment simply performs separation determination between the first signal variation and the second signal variation (achieves the separation determination only through determination on a magnitude relationship with one threshold Vth. After that, the process is advanced to step S15 as well.

In step S15, the compensation section 122 determines whether or not the entire compensation processing illustrated in FIG. 9 is finished in response to, for example, an instruction signal from a user. When the compensation processing is determined to be not finished (step S15: N), the process is returned to step S11. When the compensation processing is determined to be finished (step S15: Y), the entire compensation processing illustrated in FIG. 9 is finished.

As described hereinbefore, in the first embodiment, the resistor R for adjustment of the temporal variation characteristics (attenuation characteristics) of the detection voltage V0 (detection signal Sin) is disposed between the positive input terminal and the negative input terminal of the signal amplifier 22, it is therefore possible to compensate the temporal variation characteristics in a simple and appropriate manner. Consequently, it is possible to improve detection accuracy by a simple method (with a simple configuration and realtime processing)

Moreover, unlike other complicated compensation methods, it is possible to provide further effects such as no necessity of a target value, no necessity of input control, no necessity of data accumulation, an inexpensive system, and a small circuit scale.

Second Embodiment

A second embodiment of the present disclosure is now described. While the first embodiment has been described with an exemplary case of compensation processing where attenuation characteristics are suppressed while an output value is held, the second embodiment is described with an exemplary case of compensation processing where attenuation characteristics are suppressed through cumulative addition operation using attenuation amount information. It is to be noted that the same components as those in the first embodiment are designated by the same numerals, and description of them is appropriately omitted.

[Configuration of Polymer Sensor Module 1A]

Figure 11:
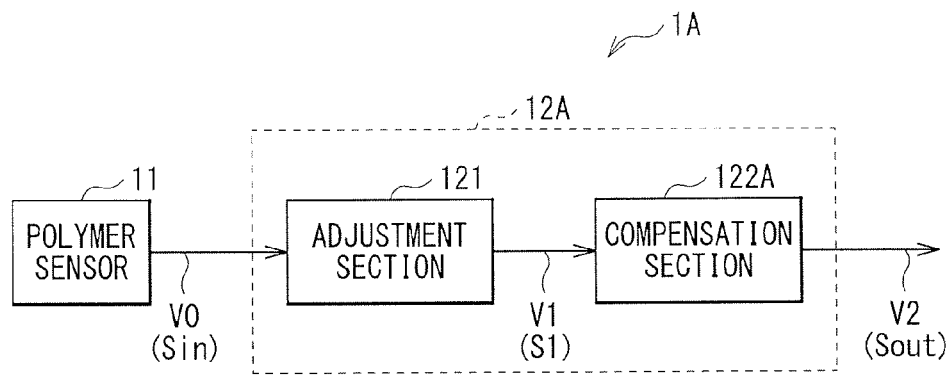
FIG. 11 is a block diagram illustrating an exemplary configuration of a polymer sensor module according to a second embodiment.

FIG. 11 is a block diagram illustrating an exemplary schematic configuration of a bend sensor module (polymer sensor module 1A) according to the second embodiment. The polymer sensor module 1A according to the second embodiment includes a polymer sensor 11 and a signal compensation unit 12A.

The signal compensation unit 12A includes an adjustment section 121 and a compensation section 122A. Specifically, the signal compensation unit 12A corresponds to a modification of the signal compensation unit 12 in the first embodiment, of which the configuration is similar to that of the signal compensation unit 12 except that the compensation section 122A is provided in place of the compensation section 122.

(Compensation Section 122A)

Figure 12:
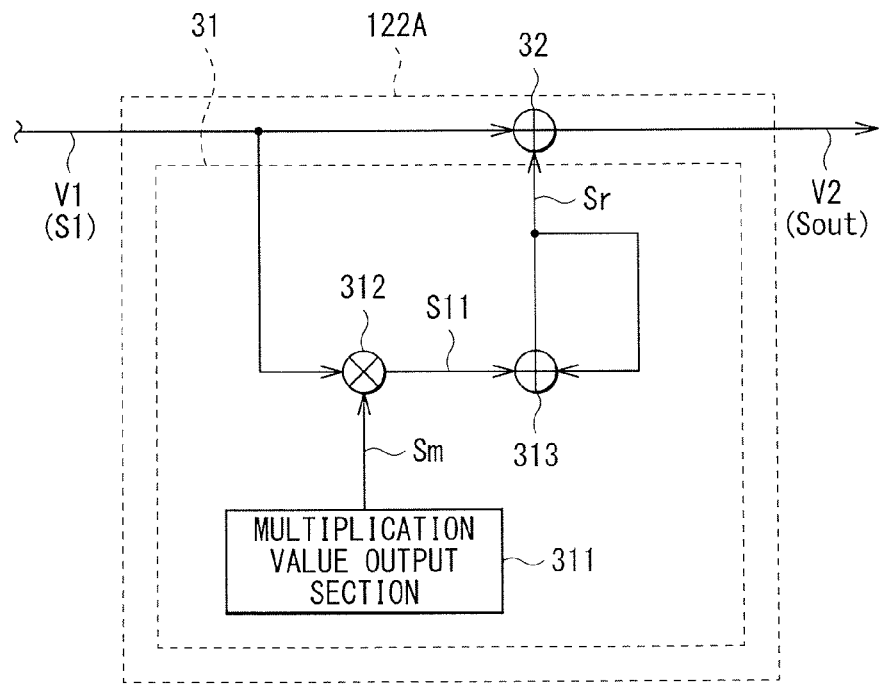
FIG. 12 is a block diagram illustrating a detailed exemplary configuration of a compensation section illustrated in FIG. 11.

FIG. 12 is a block diagram illustrating a detailed exemplary configuration of the compensation section 122A. The compensation section 122A includes a compensation amount derivation section 31 and a compensation amount addition section 32. The compensation amount derivation section 31 is configured to derive (calculate) compensation amount Sr in signal compensation by the compensation section 122A. The compensation amount addition section 32 is configured to add the compensation amount Sr derived by the compensation amount derivation section 31 to the adjusted voltage V1 (adjusted signal S1), thereby generates the compensated voltage V2 (compensated signal Sout).

The compensation amount derivation section 31 includes a multiplication value output section 311, a multiplication section 312, and an addition section 313.

The multiplication value output section 311 is configured to output a multiplication value Sm (in this exemplary case, a fixed value) as attenuation amount information beforehand prepared in correspondence to one type of attenuation line described later.

The multiplication section 312 is configured to multiply the adjusted voltage V1 (adjusted signal S1) by the multiplication value Sm output from the multiplication value output section 311, thereby generates a multiplication signal S11.

The addition section 313 is configured to add the multiplication signal S11 output from the multiplication section 312 to an output signal (compensation amount Sr) from the addition section 313 itself (perform cumulative addition operation), thereby generates the compensation amount Sr.

Although some time is taken for generating the compensation amount Sr in the compensation amount derivation section 31, such a delay is within an adjustable range during addition by the compensation amount addition section 32. In other words, in the compensation section 122A, the processing delay with respect to the received adjusted voltage V1 (adjusted signal S1) is at a substantially negligible level.

[Functions and Effects of Polymer Sensor Module 1A]

In the polymer sensor module 1A having such a configuration according to the second embodiment, it is basically possible to provide effects similar to those of the first embodiment through functions similar to those of the first embodiment.

In addition, particularly in the second embodiment, attenuation characteristics of the detection voltage V0 (detection signal Sin) is approximated using one type of an attenuation line. The reason for this is as follows.

Figure 13:
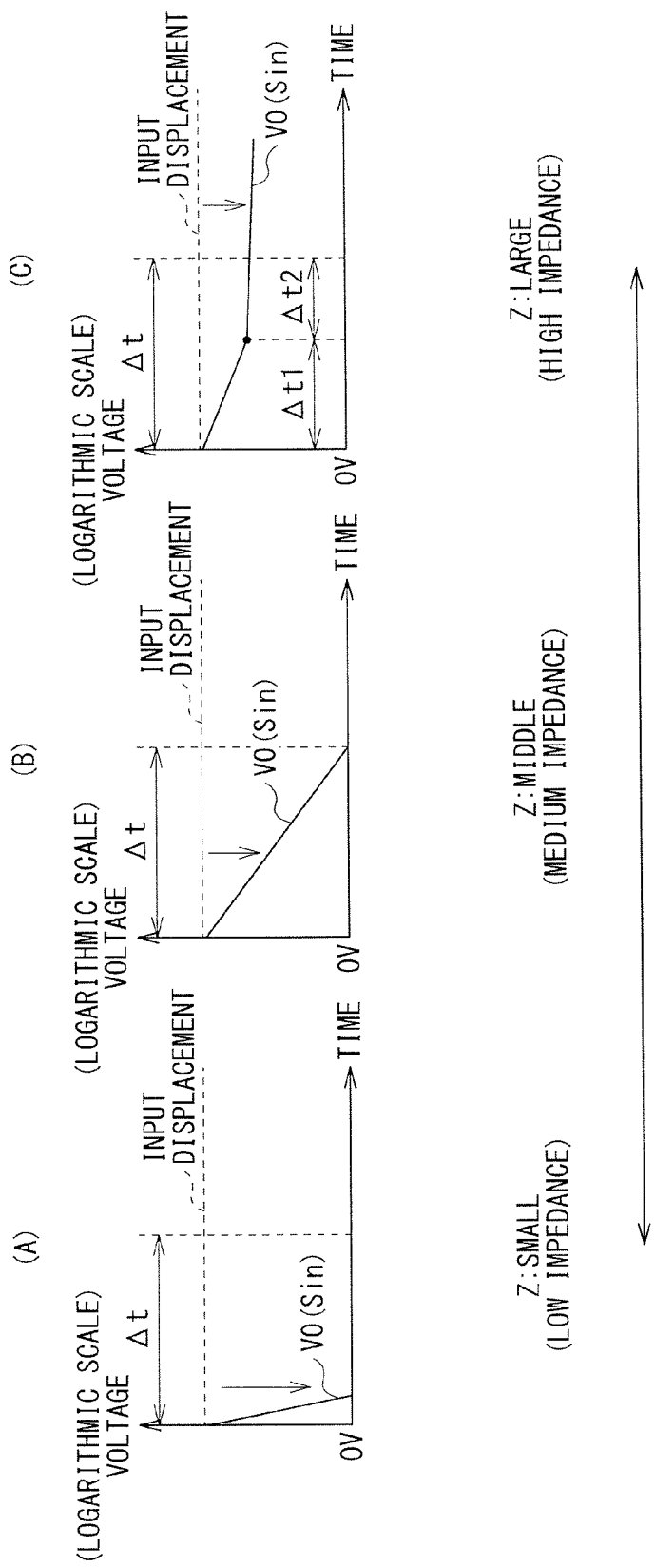
FIG. 13 is another schematic diagram for explaining a relationship between magnitude of impedance and a detection signal in an adjustment section.

First, for example, as illustrated in (A) to (C) of FIG. 13, as the impedance Z increases, the attenuation characteristics of the detection voltage V0 (detection signal Sin) are in general approximated using two or more types of attenuation lines (characteristic lines each having a predetermined attenuation rate (for example, an exponential function line) rather than one type of attenuation line. Specifically, in this exemplary case, in each of (A) (a low impedance state) and (B) (a medium impedance state) of FIG. 13, the attenuation characteristics of the detection voltage V0 (detection signal Sin) are approximated using one type of attenuation line within a predetermined measurement period Δt. On the other hand, in (C) (a high impedance state) of FIG. 13, the attenuation characteristics of the detection voltage V0 (detection signal Sin) are approximated using two types of attenuation lines within the predetermined measurement period Δt. Specifically, the measurement period Δt is configured of a measurement period Δt1 in which the attenuation characteristics are approximated using a first attenuation line, and a measurement period Δt2 in which the attenuation characteristics are approximated using a second attenuation line.

If the attenuation rate is varied halfway in this way, handling may be difficult during compensation in a subsequent stage. Hence, in light of further securing simple compensation by the compensation section 122A, it may be said that magnitude of the impedance Z of the resistor R is desirably adjusted such that the attenuation characteristics of the detection voltage V0 (detection signal Sin) are approximated using one type of attenuation line. Specifically, it may be said that magnitude of the impedance Z is desirably adjusted such that the suppression level of the attenuation characteristics is maximized while the attenuation characteristics are approximated using one type of attenuation line, in order to achieve both a suppression level of the attenuation characteristics and further securing of simple compensation.

Figure 14:
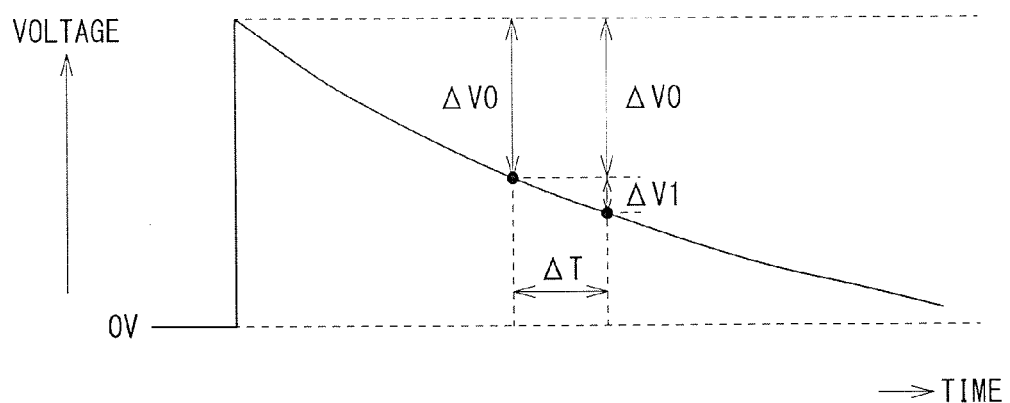
FIG. 14 is a timing waveform diagram illustrating exemplary compensation processing of a compensation section illustrated in FIG. 12.

The compensation section 122A performs cumulative addition operation on the adjusted voltage V1 (adjusted signal S1) using the multiplication value Sm (fixed value) as attenuation amount information beforehand prepared in correspondence to the one type of attenuation line, thereby performs signal compensation that suppresses the attenuation characteristics. Specifically, for example, as illustrated in FIG. 14, the attenuation amount (above-described difference value ΔV1) in the predetermined unit time ΔT is further added to the difference value ΔV0 obtained through cumulative addition in a previous period, thereby performs such signal compensation that suppresses the attenuation characteristics.

Consequently, the second embodiment allows to further provide the following advantages compared with the first embodiment. Specifically, while the compensation processing in the first embodiment may have a possibility of erroneous determination during separation of signal variation, the compensation processing in the second embodiment has no factor of erroneous determination and therefore allows system stability to be improved.

Modifications of Second Embodiment

Modifications (Modifications 1 and 2) of second embodiment are now described. In each of the Modifications 1 and 2, two or more of types of attenuation amount information are switched depending on compensation areas. In other words, in the Modifications 1 and 2, the attenuation characteristics of the adjusted voltage V1 (adjusted signal S1) are approximated using two or more of types of attenuation lines. It is to be noted that the same components as those in the second embodiment are designated by the same numerals, and description of them is appropriately omitted.

Modification 1

Figure 15:
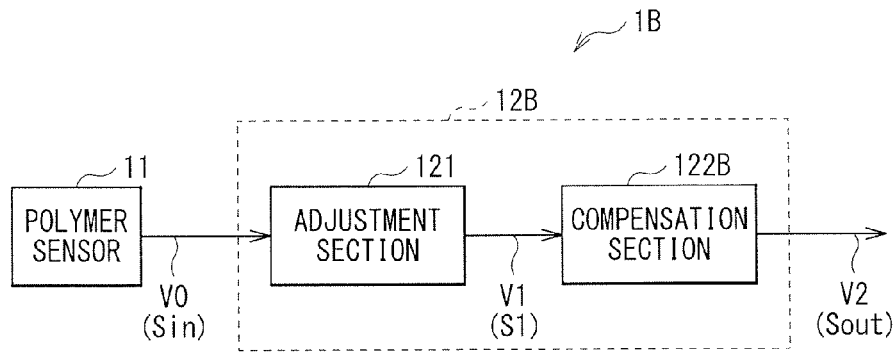
FIG. 15 is a block diagram illustrating an exemplary configuration of a polymer sensor module according to Modification 1.

FIG. 15 is a block diagram illustrating an exemplary schematic configuration of a bend sensor module (polymer sensor module 1B) according to the Modification 1. The polymer sensor module 1B according to the Modification 1 includes a polymer sensor 11 and a signal compensation unit 12B.

The signal compensation unit 12B includes an adjustment section 121 and a compensation section 122B. Specifically, the signal compensation unit 12B corresponds to a modification of the signal compensation unit 12 in the first embodiment, of which the configuration is similar to that of the signal compensation unit 12 except that the compensation section 122B is provided in place of the compensation section 122.

Figure 16:
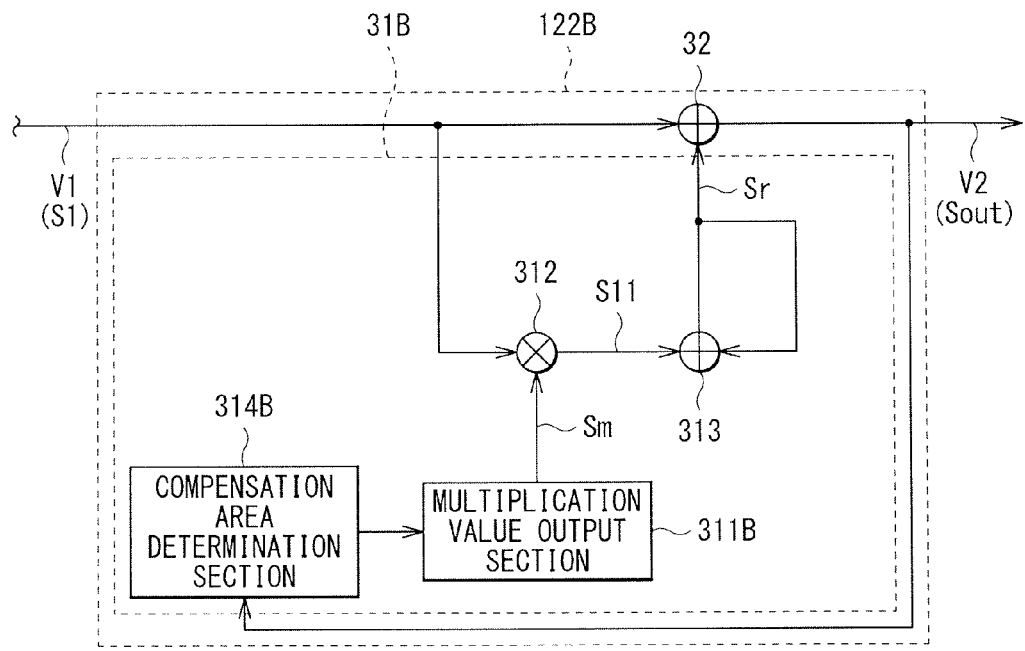
FIG. 16 is a block diagram illustrating a detailed exemplary configuration of a compensation section illustrated in FIG. 15.

FIG. 16 is a block diagram illustrating a detailed exemplary configuration of the compensation section 122B. The compensation section 122B includes a compensation amount derivation section 31B and a compensation amount addition section 32. The compensation amount derivation section 31B corresponds to a modification of the compensation amount derivation section 31 in the second embodiment, of which the configuration is similar to that of the compensation amount derivation section 31 except that a multiplication value output section 311B is provided in place of the multiplication value output section 311, and a compensation area determination section 314B is further provided.

The compensation area determination section 314B is configured to receive feedback input of the compensated voltage V2 (compensated signal Sout) output from the compensation section 122B, and performs level determination of the compensated voltage V2 (compensated signal Sout) or determination of elapsed time in a hold state, thereby determines compensation areas. Each of the compensation areas are provided in correspondence to each of the two or more types of attenuation lines, and different types of attenuation amount information (multiplication values Sm) are set for the individual compensation areas. In the case where the compensation area determination section 314B receives feedback input of the compensated voltage V2 (compensated signal Sout) as in the Modification 1, the compensation areas are desirably determined using determination of the elapsed time in the hold state rather than the level determination.

Specifically, in the Modification 1, unlike in the second embodiment, the attenuation amount information (multiplication value Sm) is not a fixed value, and the multiplication value output section 311B is provided with a plurality of types of attenuation amount information (multiplication values Sm) depending on compensation areas. In other words, the multiplication value output section 311B in the Modification 1 outputs one of the plurality of types of attenuation amount information (multiplication values Sm) in a selectively switchable manner depending on the compensation area determined by the compensation area determination section 314B.

Figure 17A:
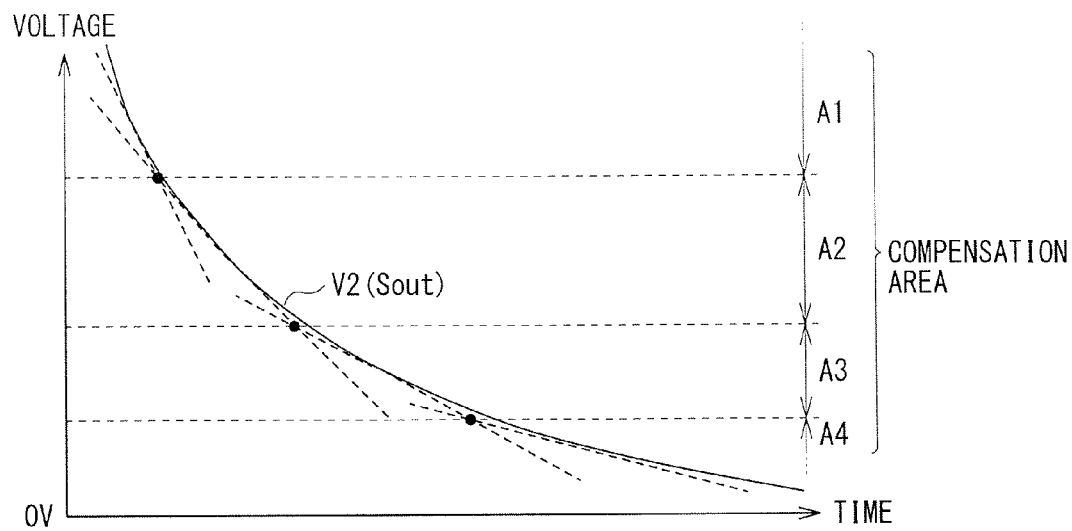
FIG. 17A is a timing waveform diagram for explaining an example of compensation processing of a compensation section illustrated in FIG. 16.
Figure 17B:
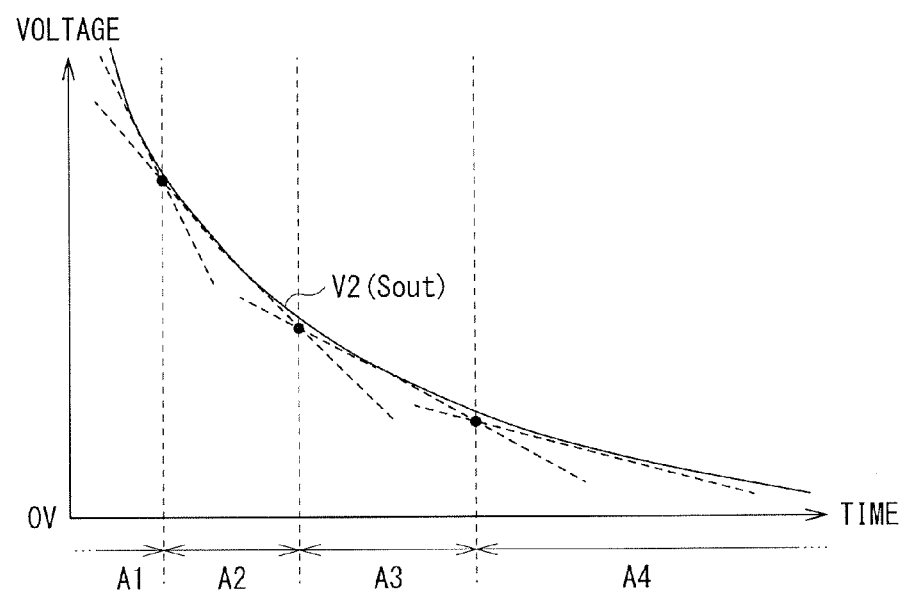
FIG. 17B is a timing waveform diagram for explaining another example of the compensation processing of the compensation section illustrated in FIG. 16.

Specifically, for example, as illustrated in FIGS. 17A and 17B, if the attenuation characteristics at the compensated voltage V2 (compensated signal Sout) are approximated using four types of attenuation lines, the following configuration is given. Specifically, in an exemplary case of FIG. 17A (a case of dividing a compensation area using level determination), an attenuation curve is subjected to area division with linear approximation (vertically divided with reference to an intersection of straight lines), so that four compensation areas A1 to A4 divided along a level (voltage) direction are set. In an exemplary case of FIG. 17B (a case of dividing a compensation area using determination of elapsed time in the hold state), linear approximation of an attenuation curve is used as in the case of FIG. 17A, so that four compensation areas A1 to A4 divided along a temporal direction are set. In each of the compensation areas A1 to A4, one attenuation amount information (multiplication value Sm) is used on a condition that attenuation occurs at one rate.

According to such a configuration, the polymer sensor module 1B of the Modification 1 further provides the following advantage compared with the second embodiment. Specifically, in the signal compensation by the compensation section 122B, one of the plurality of types of attenuation amount information (multiplication values Sm) is used in a selectively switchable manner depending on the determined compensation area; hence, it is possible to perform more fine (accurate) signal compensation than in the second embodiment.

Modification 2

Figure 18:
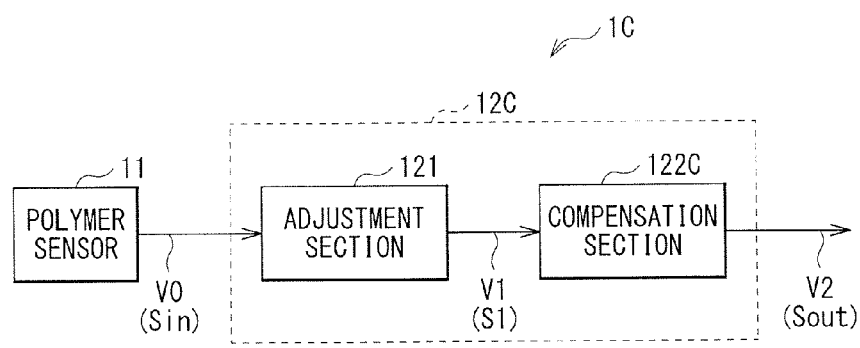
FIG. 18 is a block diagram illustrating an exemplary configuration of a polymer sensor module according to Modification 2.

FIG. 18 is a block diagram illustrating an exemplary schematic configuration of a bend sensor module (polymer sensor module 1C) according to Modification 2. The polymer sensor module 1C according to the Modification 2 includes a polymer sensor 11 and a signal compensation unit 12C.

The signal compensation unit 12C includes an adjustment section 121 and a compensation section 122C. Specifically, the signal compensation unit 12C corresponds to a modification of the signal compensation unit 12 in the first embodiment, of which the configuration is similar to that of the signal compensation unit 12 except that the compensation section 122C is provided in place of the compensation section 122.

Figure 19:
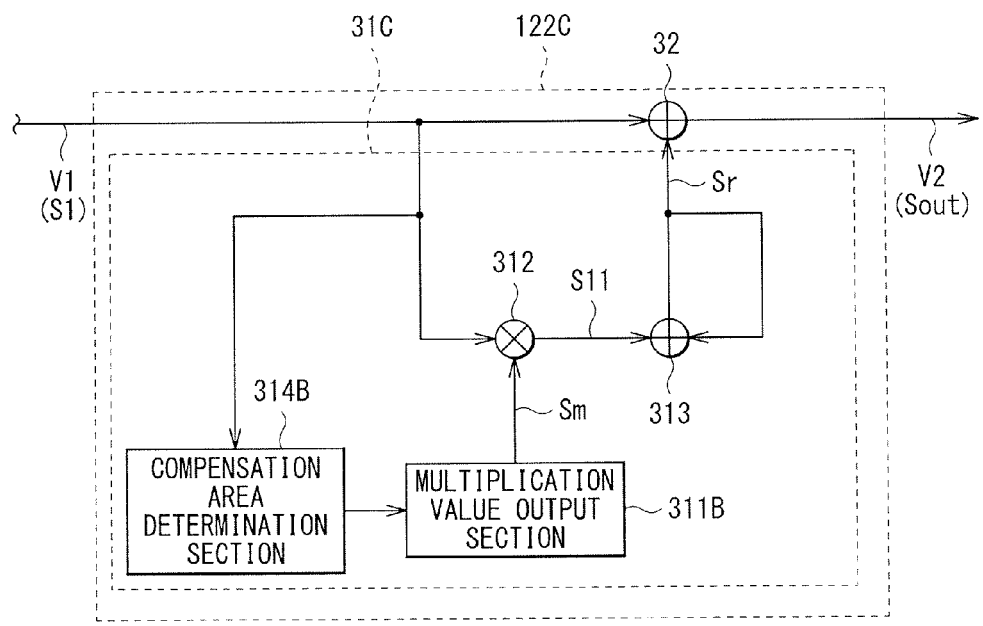
FIG. 19 is a block diagram illustrating a detailed exemplary configuration of a compensation section illustrated in FIG. 18.

FIG. 19 is a block diagram illustrating a detailed exemplary configuration of the compensation section 122C. The compensation section 122C includes a compensation amount derivation section 31C and a compensation amount addition section 32. The compensation amount derivation section 31C corresponds to a modification of the compensation amount derivation section 31B in the Modification 1, of which the configuration is similar to that of the compensation amount derivation section 31B except that a received signal of the compensation area determination section 314B is different from that of the compensation area determination section 314.

Specifically, the compensation area determination section 314B is configured to receive the adjusted voltage V1 (adjusted signal S1) received by the compensation section 122C, and performs level determination of the adjusted voltage V1 (adjusted signal S1) or determination of elapsed time in a hold state, thereby determines compensation areas.

According to such a configuration, the polymer sensor module 1C of the Modification 2 is allowed to provide the following effect in addition to the effects of the Modification 1. Specifically, the compensation area determination section 314B of the Modification 2 uses a signal on a relatively upstream side (at a position where the attenuation amount is relatively small). It is therefore possible to improve response during signal compensation compared with the Modification 1. On the other hand, the compensation area determination section 314 of the Modification 1 uses the compensated signal (compensated signal Sout). It is therefore possible to improve determination accuracy of hold time, for example. Consequently, it may be said that the Modification 1 improves determination accuracy of a compensation area compared with the Modification 2, and thus allows signal compensation to be performed more appropriately. Hence, the compensation methods in the Modifications 1 and 2 may be appropriately selected depending on purposes, applications, and the like.

Third Embodiment

A third embodiment of the present disclosure is now described. The third embodiment is described with an exemplary case where the compensation processing described in the first embodiment and the compensation processing described in the second embodiment (or each of the Modifications 1 and 2) are performed in a parallel manner. It is to be noted that the same components as those in the first and second embodiments are designated by the same numerals, and description of them is appropriately omitted.

Figure 20:
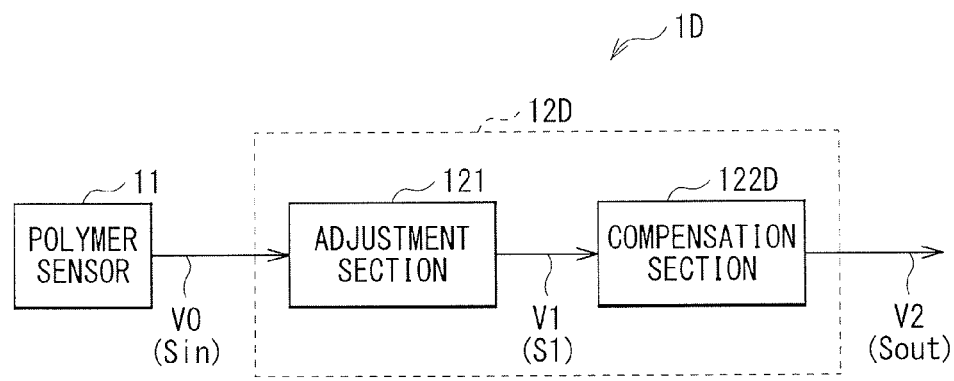
FIG. 20 is a block diagram illustrating an exemplary configuration of a polymer sensor module according to a third embodiment.

FIG. 20 is a block diagram illustrating an exemplary schematic configuration of a bend sensor module (polymer sensor module 1D) according to the third embodiment. The polymer sensor module 1D according to the third embodiment includes a polymer sensor 11 and a signal compensation unit 12D.

The signal compensation unit 12D includes an adjustment section 121 and a compensation section 122D. Specifically, the signal compensation unit 12D corresponds to a modification of the signal compensation unit 12 in the first embodiment, of which the configuration is similar to that of the signal compensation unit 12 except that the compensation section 122D is provided in place of the compensation section 122.

Figure 21:
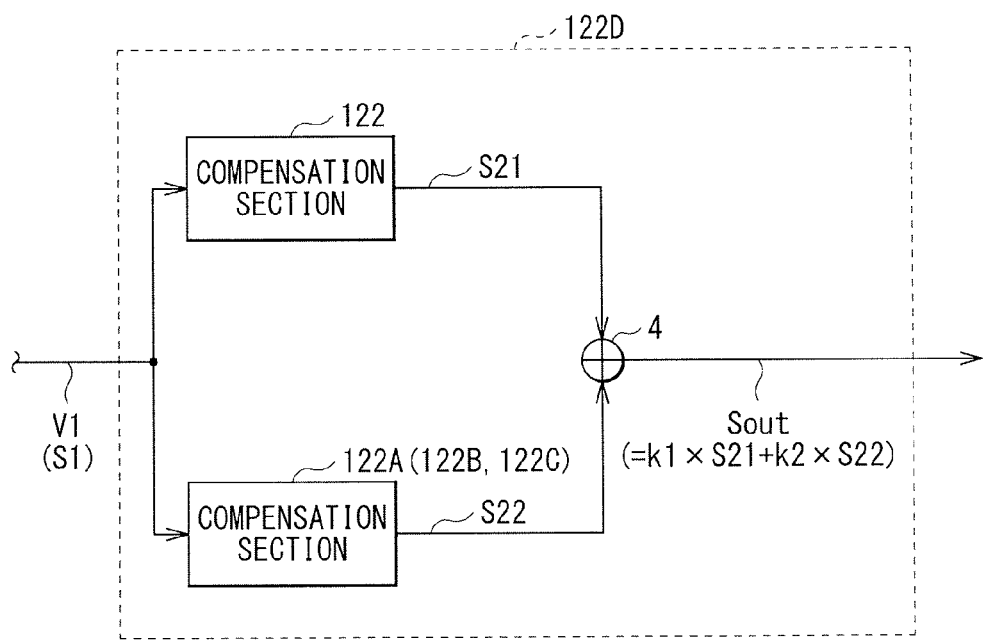
FIG. 21 is a block diagram illustrating a detailed exemplary configuration of a compensation section illustrated in FIG. 20.

FIG. 21 is a block diagram illustrating a detailed exemplary configuration of the compensation section 122D. The compensation section 122D includes the compensation section 122 described in the first embodiment, the compensation section 122A described in the second embodiment (or one of the compensation sections 122B and 122C described in the Modifications 1 and 2), and a weighting addition section 4.

As described above, the compensation section 122 and the compensation section 122A (or one of the compensation sections 122B and 122C) are disposed in a parallel manner. Specifically, the compensation section 122 performs the above-described signal compensation (first signal compensation) on the detection signal S1, thereby generates a compensated signal S21. On the other hand, the compensation section 122A (or one of the compensation sections 122B and 122C) performs the above-described signal compensation (second signal compensation) on the detection signal S1, thereby generates a compensated signal S22.

The weighting addition section 4 performs weighting addition based on the compensated signals S21 and S22 obtained in the above manner, thereby performs signal compensation that suppresses the attenuation characteristics. Specifically, the weighting addition section 4 performs weighting addition using the following Formula (1), and generates the compensated signal Sout. It is to be noted that k1 and k2 in Formula (1) each indicates a predetermined weighting coefficient, and, for example, are set to satisfy (k1+k2)=1.

$$Sout=(k1 \times S21 + k2 \times S22) \qquad (1)$$

According to such a configuration, the polymer sensor module 1D of the third embodiment achieves fine (accurate) signal compensation depending on purposes, applications, etc., compared with in the first and second embodiments, and the like.

Fourth Embodiment

A fourth embodiment of the present disclosure is now described. The fourth embodiment is described with an exemplary case where the compensation processing described in the first embodiment and the compensation processing described in the second embodiment (or each of the Modifications 1 and 2) are performed in a series manner. It is to be noted that the same components as those in the first to third embodiments are designated by the same numerals, and description of them is appropriately omitted.

Figure 22:
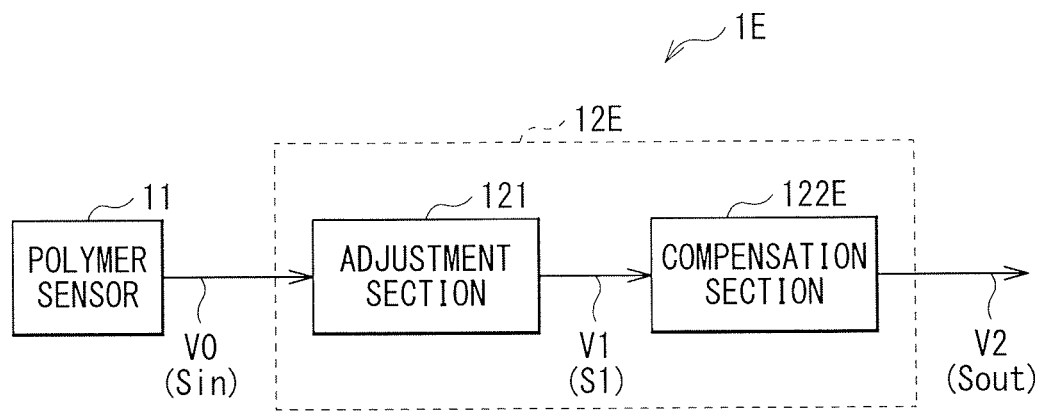
FIG. 22 is a block diagram illustrating an exemplary configuration of a polymer sensor module according to a fourth embodiment.

FIG. 22 is a block diagram illustrating an exemplary schematic configuration of a bend sensor module (polymer sensor module 1E) according to the fourth embodiment. The polymer sensor module 1E according to the fourth embodiment includes a polymer sensor 11 and a signal compensation unit 12E.

The signal compensation unit 12E includes an adjustment section 121 and a compensation section 122E. Specifically, the signal compensation unit 12E corresponds to a modification of the signal compensation unit 12 in the first embodiment, of which the configuration is similar to that of the signal compensation unit 12 except that the compensation section 122E is provided in place of the compensation section 122.

Figure 23:
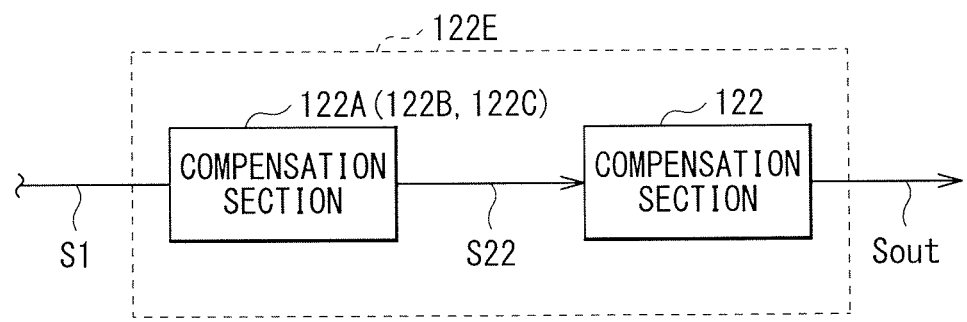
FIG. 23 is a block diagram illustrating a detailed exemplary configuration of a compensation section illustrated in FIG. 22.

FIG. 23 is a block diagram illustrating a detailed exemplary configuration of the compensation section 122E. The compensation section 122E includes the compensation section 122 described in the first embodiment, and the compensation section 122A described in the second embodiment (or one of the compensation sections 122B and 122C described in the Modifications 1 and 2).

As described above, the compensation section 122 and the compensation section 122A (or one of the compensation sections 122B and 122C) are disposed in a series manner. Specifically, in this exemplary case, the compensation section 122A (or one of the compensation sections 122B and 122C) is disposed on a former stage side, while the compensation section 122 is disposed on a subsequent stage side. In other words, the compensation section 122 is disposed on a subsequent stage side of the compensation section 122A (or one of the compensation sections 122B and 122C).

Hence, the compensation section 122 performs the above-described signal compensation on the compensated signal S22 output from the compensation section 122A (or one of the compensation sections 122B and 122C), thereby further performs signal compensation that suppresses the attenuation characteristics.

According to such a configuration, the polymer sensor module 1E of the fourth embodiment performs signal compensation in a two-stage configuration, thereby achieves finer (more accurate) signal compensation than in the first and second embodiments.

Fifth Embodiment

A fifth embodiment of the present disclosure is now described. The fifth embodiment is described with an exemplary case of compensation processing where the attenuation characteristics are suppressed using predetermined waveform equalization processing. It is to be noted that the same components as those in the first to fourth embodiments are designated by the same numerals, and description of them is appropriately omitted.

Figure 24:
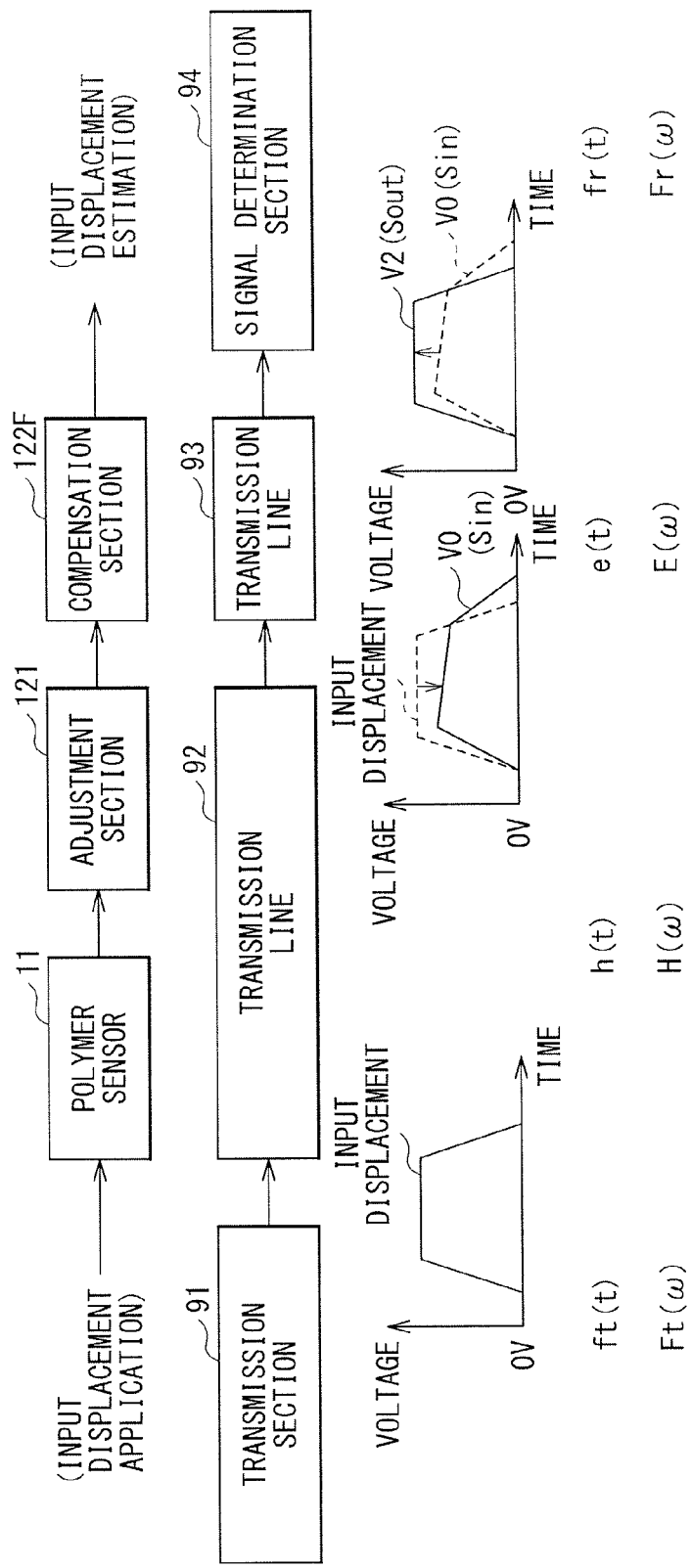
FIG. 24 is a block diagram for explaining exemplary compensation processing by a compensation section of a polymer sensor module according to a fifth embodiment.
Figure 25:
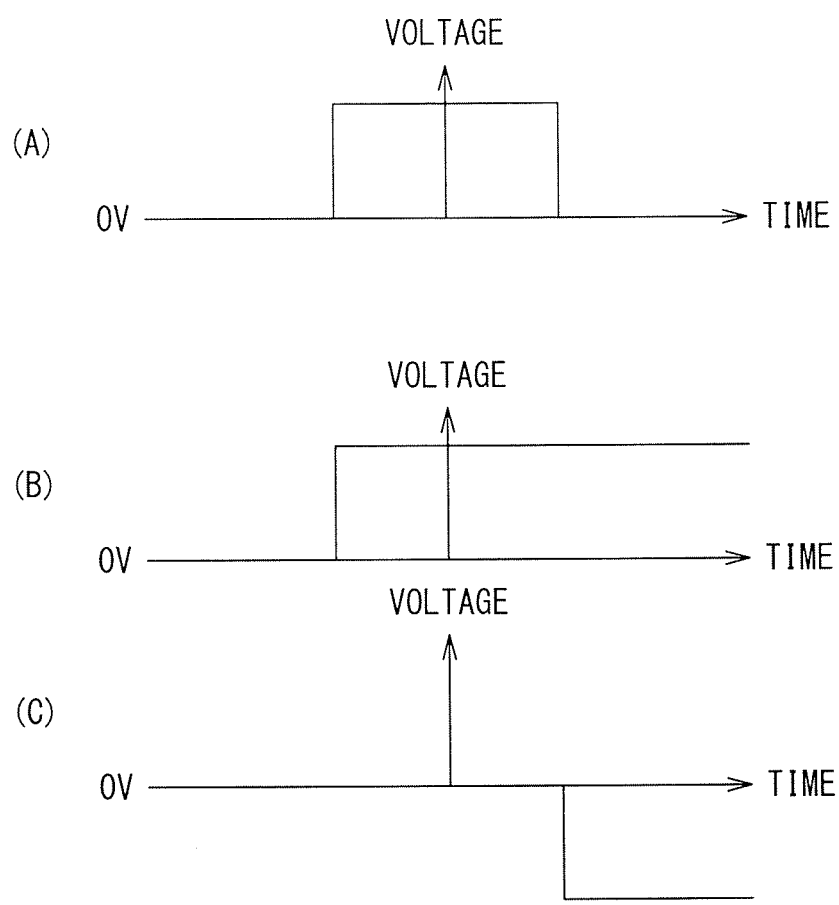
FIG. 25 is a timing waveform diagram for explaining the exemplary compensation processing illustrated in FIG. 24.
Figure 26:
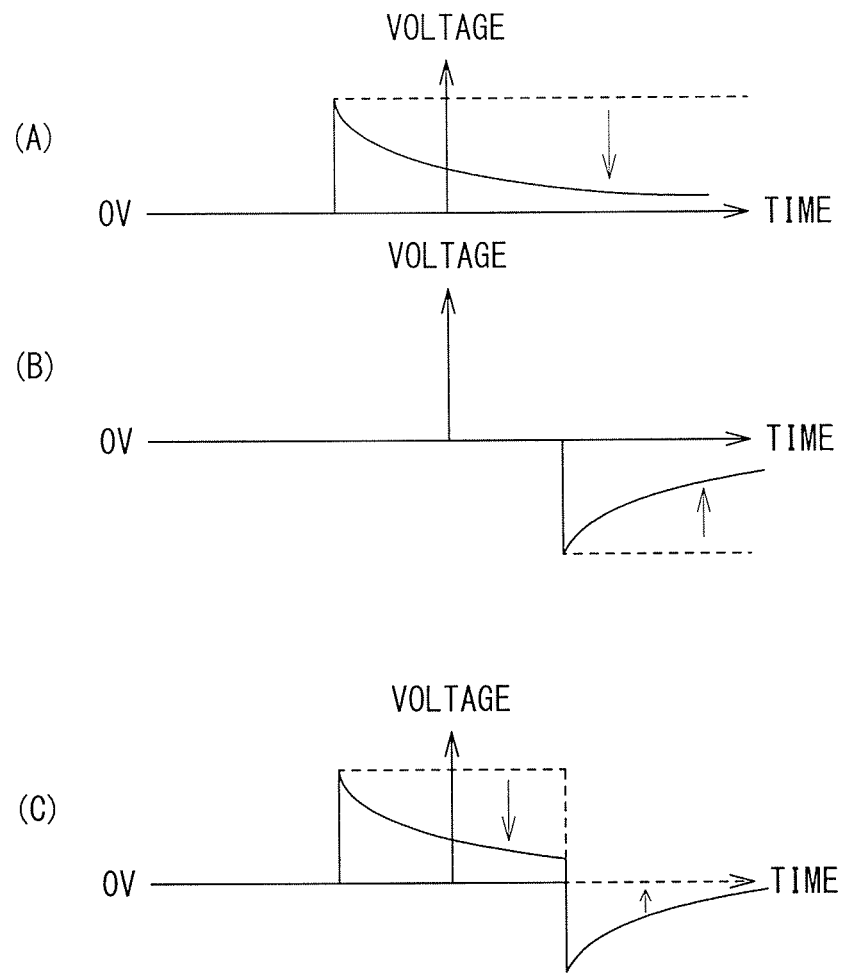
FIG. 26 is another timing waveform diagram for explaining the exemplary compensation processing illustrated in FIG. 24.

A compensation section 122F (see FIG. 24) of the fifth embodiment performs compensation processing of suppressing the attenuation characteristics using waveform equalization processing of an LCR circuit. To design the LCR circuit, first, input displacement of a step response is applied to the polymer sensor 11, and attenuation characteristics observed at that time is acquired (for example, see (A) to (C) of FIG. 25 and (A) to (C) of FIG. 26). Subsequently, a time response of an isolated square pulse is obtained from the step response. Subsequently, the time response of the isolated square pulse is subjected to Fourier transform to obtain a frequency response. A frequency response of an equalization filter is obtained from a difference between the obtained frequency response and a frequency response of the square wave (isolated square pulse). The LCR circuit is allowed to be designed from the frequency response of the equalization filter. Also, it is allowable that frequency response of the equalization filter is subjected to Fourier inverse transform separately from the LCR circuit, so that a time response is obtained, and a transversal filter is designed to perform the same waveform equalization.

In the fifth embodiment having such a configuration, it is basically possible to provide effects similar to those of the first embodiment through functions similar to those of the first embodiment. However, it may be said that the fifth embodiment is different in approach to compensation processing from the previously described first to fourth embodiments. First, while the former is merely processing for making an attenuation curve to be flat, the latter is processing of equalizing transmission line characteristics (attenuation characteristics) themselves. Moreover, while the former is an individual-type process where the attenuation characteristics are produced for each attenuation curve, the latter is an almighty process. It may be said that the former is far excellent in simplicity of processing, while the latter is averagely excellent in processing accuracy.

Modifications Common to First to Fifth Embodiment

Modifications (Modifications 3 and 7) common to the first to fifth Embodiments (and the Modifications 1 and 2) are now described. Each of the Modifications 3 and 7 corresponds to another exemplary layout configuration of the resistor for adjustment of the attenuation characteristics in an adjustment section. It is to be noted that the same components as those in the first to fifth embodiments are designated by the same numerals, and description of them is appropriately omitted.

Modifications 3 to 7

Figure 27:
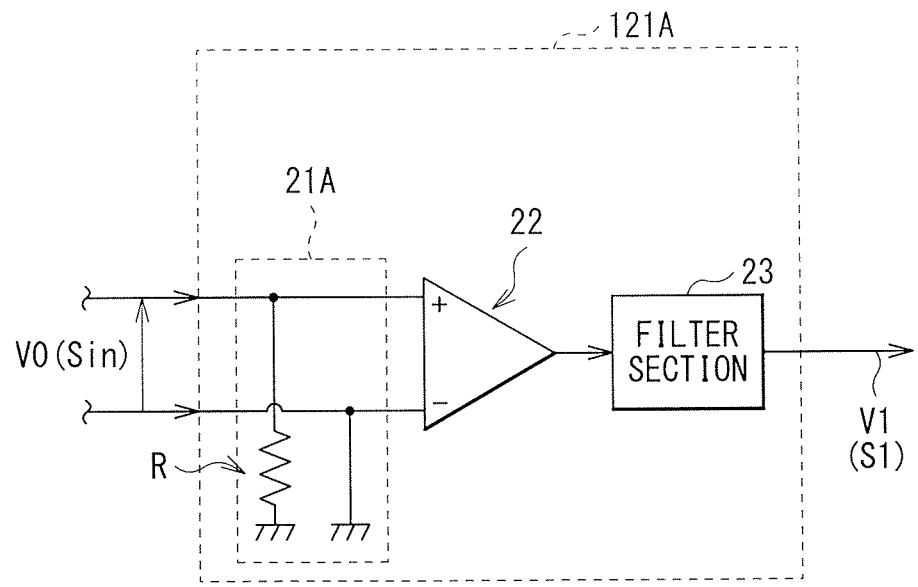
FIG. 27 is a circuit diagram illustrating an exemplary configuration of an adjustment section according to Modification 3.

FIG. 27 is a circuit diagram illustrating an exemplary configuration of an adjustment section (adjustment section 121A) according to Modification 3. The adjustment section 121A in the Modification 3 corresponds to a modification of the adjustment section 121 in the first embodiment, of which the configuration is similar to that of the adjustment section 121 except that an impedance adjustment section 21A is provided in place of the impedance adjustment section 21. In the impedance adjustment section 21A, a first end of the resistor R is electrically connected to a signal line (a signal line on a positive input terminal side) for the detection signal Sin, and a second end of the resistor R is electrically connected to a reference potential (in this exemplary case, ground potential). In this exemplary case, a signal line on a negative input terminal side for the detection signal Sin is also electrically connected to the ground potential.

Figure 28:
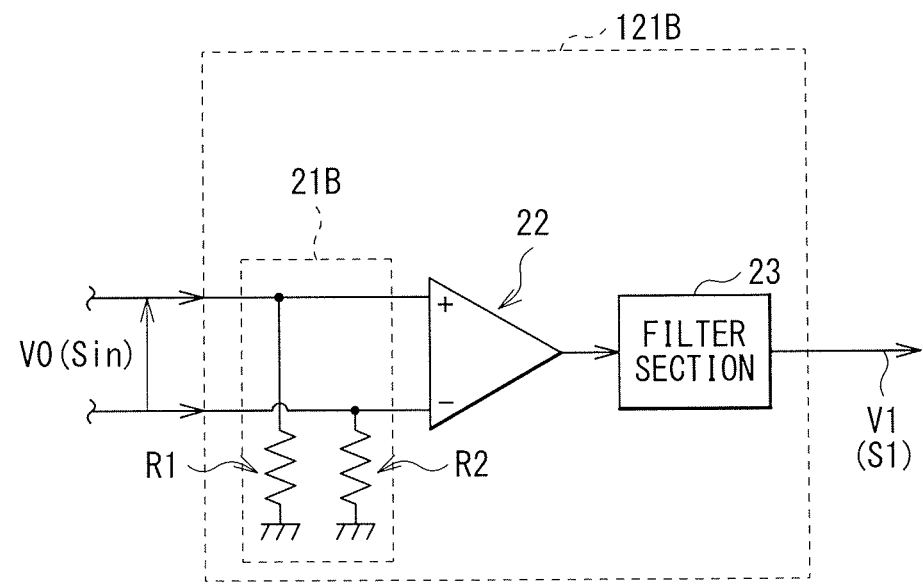
FIG. 28 is a circuit diagram illustrating an exemplary configuration of an adjustment section according to Modification 4.

FIG. 28 is a circuit diagram illustrating an exemplary configuration of an adjustment section (adjustment section 121B) according to Modification 4. The adjustment section 121B in the Modification 4 corresponds to a modification of the adjustment section 121 in the first embodiment, of which the configuration is similar to that of the adjustment section 121 except that an impedance adjustment section 21B is provided in place of the impedance adjustment section 21. The impedance adjustment section 21B is configured using two resistors R1 and R2. Specifically, a first end of the resistor R1 is electrically connected to a signal line on a positive input terminal side for the detection signal Sin, and a second end of the resistor R1 is electrically connected to a reference potential (in this exemplary case, ground potential). In addition, a first end of the resistor R2 is electrically connected to a signal line on a negative input terminal side for the detection signal Sin, and a second end of the resistor R2 is electrically connected to the ground potential.

Figure 29:
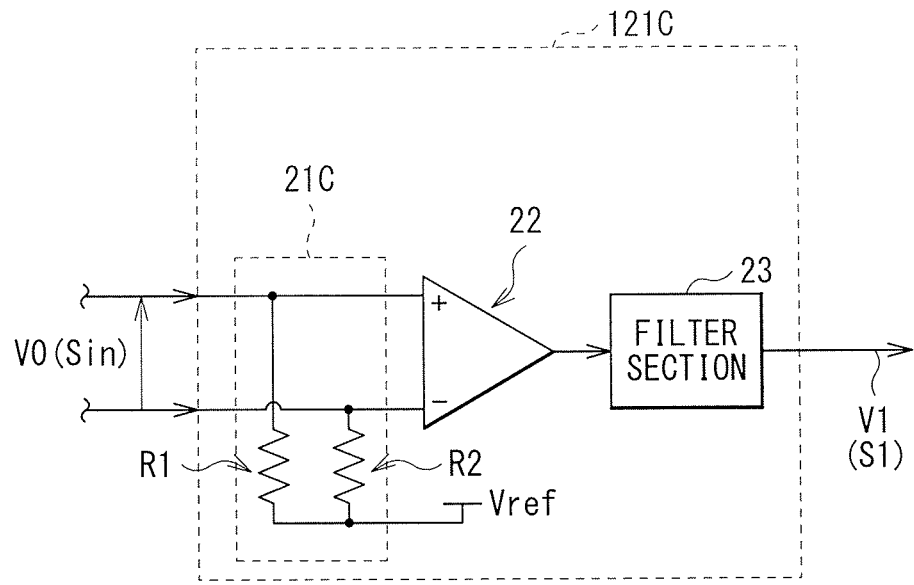
FIG. 29 is a circuit diagram illustrating an exemplary configuration of an adjustment section according to Modification 5.

FIG. 29 is a circuit diagram illustrating an exemplary configuration of an adjustment section (adjustment section 121C) according to Modification 5. The adjustment section 121C in the Modification 5 corresponds to a modification of the adjustment section 121 in the first embodiment, of which the configuration is similar to that of the adjustment section 121 except that an impedance adjustment section 21C is provided in place of the impedance adjustment section 21. The impedance adjustment section 21C is also configured using two resistors R1 and R2. Specifically, a first end of the resistor R1 is electrically connected to a signal line on a positive input terminal side for the detection signal Sin, and a first end of the resistor R2 is electrically connected to a signal line on a negative input terminal side for the detection signal Sin. Second ends of the resistors R1 and R2 are in common electrically connected to a reference potential Vref.

Figure 30:
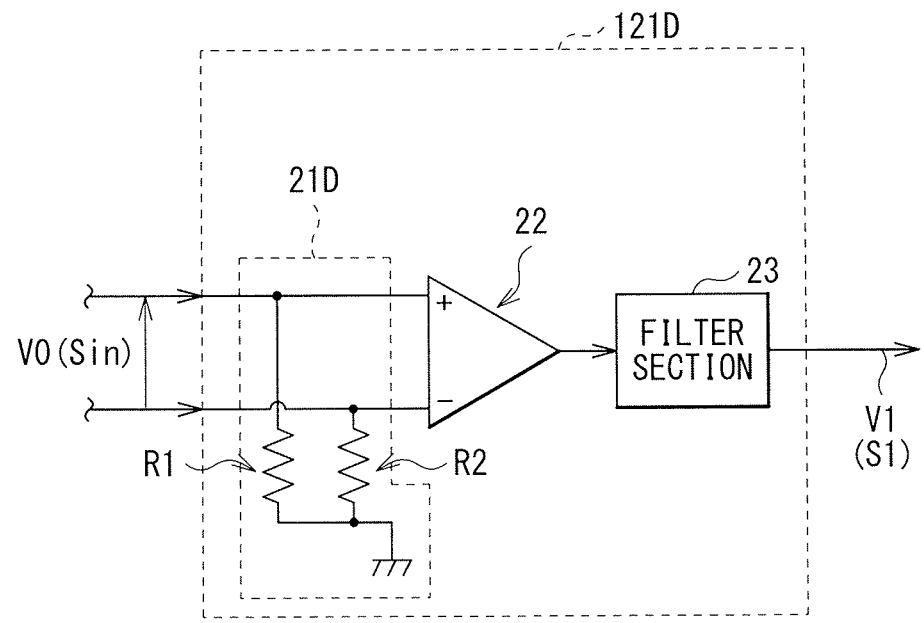
FIG. 30 is a circuit diagram illustrating an exemplary configuration of an adjustment section according to Modification 6.

FIG. 30 is a circuit diagram illustrating an exemplary configuration of an adjustment section (adjustment section 121D) according to Modification 6. The adjustment section 121D in the Modification 6 corresponds to a modification of the adjustment section 121 in the first embodiment, of which the configuration is similar to that of the adjustment section 121 except that an impedance adjustment section 21D is provided in place of the impedance adjustment section 21. The impedance adjustment section 21D is also configured using two resistors R1 and R2. Specifically, a first end of the resistor R1 is electrically connected to a signal line on a positive input terminal side for the detection signal Sin, and a first end of the resistor R2 is electrically connected to a signal line on a negative input terminal side for the detection signal Sin. Second ends of the resistors R1 and R2 are in common electrically connected to a reference potential (in this exemplary case, ground potential).

Figure 31:
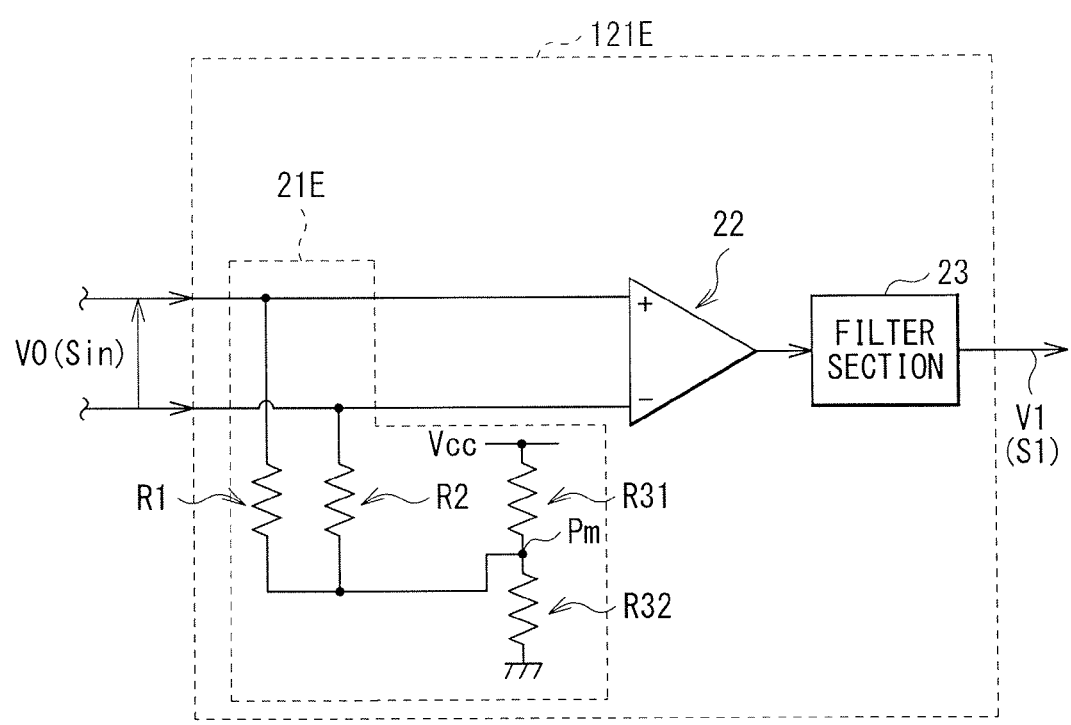
FIG. 31 is a circuit diagram illustrating an exemplary configuration of an adjustment section according to Modification 7.

FIG. 31 is a circuit diagram illustrating an exemplary configuration of an adjustment section (adjustment section 121E) according to Modification 7. The adjustment section 121E in the Modification 7 corresponds to a modification of the adjustment section 121 in the first embodiment, of which the configuration is similar to that of the adjustment section 121 except that an impedance adjustment section 21E is provided in place of the impedance adjustment section 21. The impedance adjustment section 21E is configured using two resistors R1 and R2 and two resistive dividers R31 and R32. Specifically, a first end of the resistor R1 is electrically connected to a signal line on a positive input terminal side for the detection signal Sin, and a first end of the resistor R2 is electrically connected to a signal line on a negative input terminal side for the detection signal Sin. A source voltage Vcc is divided by the two resistive dividers R31 and R32 connected in series to each other, and a midpoint potential is produced at a voltage division point Pm of the resistive dividers R31 and R32. Second ends of the resistors R1 and R2 are in common electrically connected to a reference potential (in this exemplary case, the midpoint potential).

As shown in the Modifications 3 to 7, it is possible to use various exemplary configurations for the layout of the resistor for adjustment of the attenuation characteristics within the adjustment section.

Moreover, in the Modifications 3 to 7, the second end of the resistor is electrically connected to the predetermined reference potential (for example, ground potential); hence, it is possible to suppress drift characteristics (slow variation characteristics of voltage independent of external force) in addition to the attenuation characteristics of the detection signal Sin.

Application Example

An application example (application example to an input unit and an electronic apparatus) of any of the bend sensor modules (polymer sensor modules) according to the embodiments (first to fifth embodiments) and the Modifications (the Modifications 1 to 7) described hereinbefore are now described.

Figure 32:
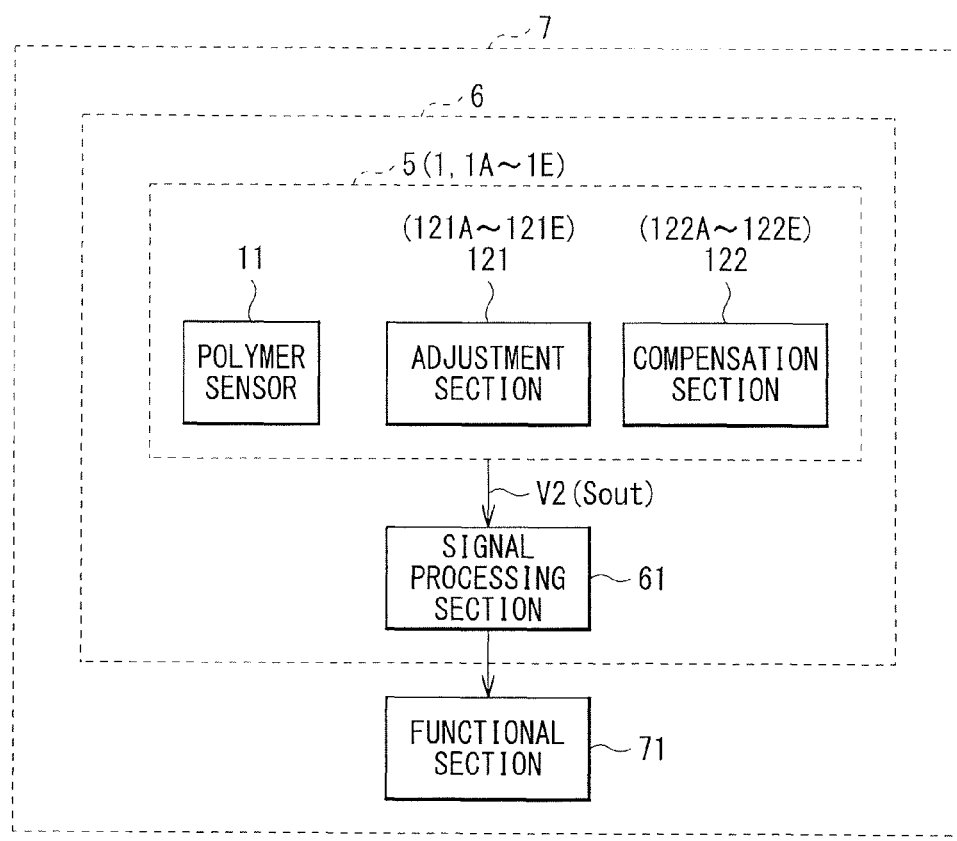
FIG. 32 is a block diagram illustrating an exemplary configuration of each of an input unit and an electronic apparatus according to an application example.

FIG. 32 is a block diagram illustrating an exemplary configuration of an input unit (input unit 6) and an electronic apparatus (electronic apparatus 7) according to the application example.

The input unit 6 includes a polymer sensor module 5 (for example, corresponding to one of the polymer sensor modules 1 and 1A to 1E described hereinbefore), and a signal processing section 61. The polymer sensor module 5 includes an optional combination of the polymer sensor 11, the adjustment section 121 (or one of the adjustment sections 121A to 121E), and the compensation section 122 (or one of the compensation sections 122A to 122F). The signal processing section 61 is configured to perform various types of signal processing on the compensated signal Sout (compensated voltage V2) output from the polymer sensor module 5. Examples of such an input unit 6 may include a controller (joystick) for a game instrument.

The electronic apparatus 7 includes the input unit 6, and a functional section 71 (a load) with each function that allows the electronic apparatus 7 to exhibit a predetermined function of itself. In this exemplary case, the functional section 71 receives an output signal from the signal processing section 61. Examples of such an electronic apparatus 7 may include a game instrument.

Other Modifications

Although the technology according to the present disclosure has been described with the embodiments, the Modifications, and the application example hereinbefore, the technology is not limited thereto, and various modifications or alterations may be made.

For example, a configuration of the adjustment section and a compensation method performed by the compensation section are not limited to those described in the embodiments, the Modifications, and the application example, and any of other configurations and of other compensation methods may be used. Specifically, for example, a thermistor or a variable resistor may be used as the resistor in the adjustment section. In some case, the signal compensation unit may incorporate only the adjustment section without incorporating the compensation section. In addition, for example, in the case where a detection signal having a practically sufficiently large signal value is obtained, a gain of the signal amplifier may be adjusted to gain=X1, or the signal amplifier itself may not be provided.

Furthermore, a shape or a material of the polymer sensor is not limited to those described in the embodiments, the Modifications, and the application example. In addition, a stacked structure of the polymer sensor is not limited to that described in the embodiments, the Modifications, and the application example, and may be appropriately modified.

In addition, although the embodiments, the Modifications, and the application example have been described with a polymer sensor as an example of "bend sensor" in the present disclosure, this is not limitative, and this technology may be applied to any of other bend sensors other than the polymer sensor.

Moreover, although the embodiments, the Modifications, and the application example have been described with an input unit and an electronic apparatus as an application example of the bend sensor module according to the present disclosure, the bend sensor module according to an embodiment of the disclosure may be applied to any of other various units (for example, an electronic device that is allowed to be curved (is bendable), such as a flexible display).

It is possible to achieve at least the following configurations from the above-described example embodiments of the disclosure.

(1) A signal compensation unit, including an adjustment section configured to adjust temporal variation characteristics of a detection signal obtained by a bend sensor, wherein the adjustment section includes:

a signal amplifier including a positive input terminal, a negative input terminal, and an output terminal, and amplifying the detection signal; and a resistor for adjustment of the temporal variation characteristics disposed between the positive input terminal and the negative input terminal of the signal amplifier.

(2) The signal compensation unit according to (1), wherein magnitude of impedance of the resistor is adjusted to allow attenuation characteristics as the temporal variation characteristics to be suppressed.

(3) The signal compensation unit according to (2), wherein as the impedance increases, a suppression level of the attenuation characteristics increases.

(4) The signal compensation unit according to (3), wherein the magnitude of the impedance is adjusted to allow the attenuation characteristics to be approximated using one or more types of attenuation lines.

(5) The signal compensation unit according to (4), wherein the magnitude of the impedance is adjusted to allow the suppression level of the attenuation characteristics to be maximized while the attenuation characteristics are approximated using one type of attenuation line.

(6) The signal compensation unit according to any one of (1) to (5), further including a compensation section configured to perform signal compensation on the detection signal subjected to adjustment of the temporal variation characteristics by the adjustment section.

(7) The signal compensation unit according to (6), wherein the compensation section performs the signal compensation on the detection signal subjected to the adjustment while separating between first signal variation in response to external input operation and second signal variation due to attenuation characteristics as the temporal variation characteristics.

(8) The signal compensation unit according to (7), wherein when amount of signal variation per unit time of the detection signal subjected to the adjustment is equal to or larger than a threshold, the compensation section determines the amount of signal variation is resulted from the first signal variation, and performs signal compensation that allows the detection signal to follow the external input operation, and when the amount of signal variation per unit time is smaller than the threshold, the compensation section determines the amount of signal variation is resulted from the second signal variation, and performs signal compensation that suppresses the attenuation characteristics.

(9) The signal compensation unit according to (8), wherein the compensation section performs signal compensation that allows an output value from the compensation section to be held, as the signal compensation that allows the attenuation characteristics to be suppressed.

(10) The signal compensation unit according to (8), wherein the attenuation characteristics of the detection signal subjected to the adjustment are approximated using one or more types of attenuation lines, and the compensation section performs cumulative addition operation on the detection signal subjected to the adjustment using attenuation amount information beforehand prepared in correspondence to the one or more types of attenuation lines, thereby performs signal compensation that suppresses the attenuation characteristics.

(11) The signal compensation unit according to (10), wherein the attenuation characteristics of the detection signal subjected to the adjustment are approximated using one type of attenuation line.

(12) The signal compensation unit according to (10), wherein the attenuation characteristics of the detection signal subjected to the adjustment are approximated using a plurality of types of attenuation lines, and the compensation section uses one of a plurality of types of attenuation amount information in a selectively switchable manner depending on a compensation area corresponding to each of the plurality of types of attenuation lines.

(13) The signal compensation unit according to (8), wherein the attenuation characteristics of the detection signal subjected to the adjustment are approximated using one or more types of attenuation lines, and the compensation section performs, in a parallel manner, first signal compensation performing signal compensation that allows an output value from the compensation section to be held, and second signal compensation that performs cumulative addition operation on the detection signal subjected to the adjustment using attenuation amount information beforehand prepared in correspondence to the one or more types of attenuation lines, and performs weighting addition based on the detection signal subjected to the first signal compensation and the detection signal subjected to the second signal compensation, thereby performs signal compensation that suppresses the attenuation characteristics.

(14) The signal compensation unit according to (8), wherein the attenuation characteristics of the detection signal subjected to the adjustment are approximated using one or more types of attenuation lines, and the compensation section performs cumulative addition operation on the detection signal subjected to the adjustment using attenuation amount information beforehand prepared in correspondence to the one or more types of attenuation lines, and then performs signal compensation that allows an output value from the compensation section to be held, thereby performs signal compensation that suppresses the attenuation characteristics.

(15) The signal compensation unit according to (8), wherein the compensation section performs the signal compensation that suppresses the attenuation characteristics using waveform equalization processing of an LCR circuit.

(16) The signal compensation unit according to any one of (1) to (15), wherein a first end of the resistor is electrically connected to a signal line for the detection signal, and a second end of the resistor is electrically connected to a reference potential.

(17) The signal compensation unit according to (16), wherein the reference potential is ground potential.

(18) A bend sensor module, including:

a bend sensor; and a signal compensation unit configured to compensate a detection signal obtained by the bend sensor, the signal compensation unit including an adjustment section configured to adjust temporal variation characteristics of the detection signal, wherein the adjustment section includes a signal amplifier including a positive input terminal, a negative input terminal, and an output terminal, and amplifying the detection signal, and a resistor for adjustment of the temporal variation characteristics disposed between the positive input terminal and the negative input terminal of the signal amplifier.

(19) The bend sensor module according to (18), wherein the bend sensor is a polymer sensor.

(20) An input unit, including:
a bend sensor module including a bend sensor; and a signal compensation unit configured to compensate a detection signal obtained by the bend sensor,
the signal compensation unit including an adjustment section configured to adjust temporal variation characteristics of the detection signal, wherein the adjustment section includes
a signal amplifier including a positive input terminal, a negative input terminal, and an output terminal, and amplifying the detection signal, and
a resistor for adjustment of the temporal variation characteristics disposed between the positive input terminal and the negative input terminal of the signal amplifier.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A signal compensation unit, comprising:
an adjustment circuit configured to adjust a detection signal associated with time from a bend sensor,
wherein the adjustment circuit includes:
a signal amplifier including a positive input terminal, a negative input terminal, and an output terminal directly connected to a filter, and the signal amplifier is configured to amplify the detection signal from the bend sensor; and
a resistor disposed between the positive input terminal and the negative input terminal of the signal amplifier, and the resistor is configured to adjust the detection signal.

2. The signal compensation unit according to claim 1, wherein the resistor has an impedance value configured to allow attenuation characteristics of the detection signal to be suppressed.

3. The signal compensation unit according to claim 2, wherein as the impedance value increases, a suppression level of the attenuation characteristics increases.

4. The signal compensation unit according to claim 3, wherein the resistor is configured to allow the attenuation characteristics to be approximated using one or more types of attenuation lines.

5. The signal compensation unit according to claim 4, wherein the resistor has the impedance value configured to allow the suppression level of the attenuation characteristics to be maximized while the attenuation characteristics are approximated using one type of attenuation line.

6. The signal compensation unit according to claim 1, further comprising a compensation unit configured to perform signal compensation on the detection signal.

7. The signal compensation unit according to claim 6, wherein the compensation unit is configured to perform the signal compensation on the detection signal subjected to the adjustment while separating between a first signal variation in response to an external input operation and a second signal variation due to attenuation characteristics of the detection signal.

8. The signal compensation unit according to claim 7, wherein when amount of signal variation per unit time of the detection signal subjected to the adjustment is equal to or larger than a threshold, the compensation unit determines the amount of signal variation is resulted from the first signal variation, and performs signal compensation that allows the detection signal to follow the external input operation, and
when the amount of signal variation per unit time is smaller than the threshold, the compensation unit determines the amount of signal variation is resulted from the second signal variation, and performs signal compensation that suppresses the attenuation characteristics.

9. The signal compensation unit according to claim 8, wherein the compensation unit is configured to perform signal compensation that allows an output value from the compensation unit to be held when the signal compensation that allows the attenuation characteristics to be suppressed.

10. The signal compensation unit according to claim 8, wherein the attenuation characteristics of the detection signal subjected to the adjustment are approximated using one or more types of attenuation lines, and
the compensation unit is configured to perform cumulative addition operation on the detection signal subjected to the adjustment using attenuation amount information beforehand prepared in correspondence to the one or more types of attenuation lines, thereby perform signal compensation that suppresses the attenuation characteristics.

11. The signal compensation unit according to claim 10, wherein the attenuation characteristics of the detection signal subjected to the adjustment are approximated using one type of attenuation line.

12. The signal compensation unit according to claim 10, wherein the attenuation characteristics of the detection signal subjected to the adjustment are approximated using a plurality of types of attenuation lines, and
the compensation unit is configured to use one of a plurality of types of attenuation amount information in a selectively switchable manner depending on a compensation area corresponding to each of the plurality of types of attenuation lines.

13. The signal compensation unit according to claim 8, wherein the attenuation characteristics of the detection signal subjected to the adjustment are approximated using one or more types of attenuation lines, and
the compensation unit is configured to perform, in a parallel manner, first signal compensation performing signal compensation that allows an output value from the compensation unit to be held, and second signal compensation that performs cumulative addition operation on the detection signal subjected to the adjustment using attenuation amount information beforehand prepared in correspondence to the one or more types of attenuation lines, and
perform weighting addition based on the detection signal subjected to the first signal compensation and the detection signal subjected to the second signal compensation, thereby perform signal compensation that suppresses the attenuation characteristics.

14. The signal compensation unit according to claim 8, wherein the attenuation characteristics of the detection signal subjected to the adjustment are approximated using one or more types of attenuation lines, and
the compensation unit is configured to perform cumulative addition operation on the detection signal subjected to the adjustment using attenuation amount information beforehand prepared in correspondence to the one or more types of attenuation lines, and then perform signal compensation that allows an output value from the compensation section to be held, thereby perform signal compensation that suppresses the attenuation characteristics.

15. The signal compensation unit according to claim 8, wherein the compensation unit is configured to perform the signal compensation that suppresses the attenuation characteristics using waveform equalization processing of an LCR circuit.

16. The signal compensation unit according to claim 1, wherein a first end of the resistor is electrically connected to the positive input terminal of the signal amplifier, and
   a second end of the resistor is electrically connected to a reference potential.

17. The signal compensation unit according to claim 16, wherein the reference potential is ground potential.

18. The signal compensation unit according to claim 16, wherein the reference potential is a ground potential.

19. The signal compensation unit according to claim 1, wherein the resistor includes a first resistor and a second resistor, and wherein a first end of the first resistor is connected to the positive input terminal of the signal amplifier and a second end of the first resistor is connected to a reference potential, and wherein a first end of the second resistor is connected to the negative input terminal of the signal amplifier and a second end of the second resistor is connected to the reference potential.

20. A bend sensor module, comprising:
   a bend sensor; and
   a signal compensation unit configured to compensate a detection signal associated with time from the bend sensor, and the signal compensation unit including an adjustment circuit configured to adjust the detection signal,
   wherein the adjustment circuit includes
      a signal amplifier including a positive input terminal, a negative input terminal, and an output terminal directly connected to a filter, and the signal amplifier is configured to amplify the detection signal from the bend sensor, and
      a resistor disposed between the positive input terminal and the negative input terminal of the signal amplifier, and the resistor is configured to adjust the detection signal.

21. The bend sensor module according to claim 20, wherein the bend sensor includes a polymer sensor.

22. An input unit, comprising:
   a bend sensor module including a bend sensor; and
   a signal compensation unit configured to compensate a detection signal associated with time obtained by the bend sensor,
   wherein the signal compensation unit including an adjustment circuit configured to adjust the detection signal, and
   wherein the adjustment circuit includes
      a signal amplifier including a positive input terminal, a negative input terminal, and an output terminal directly connected to a filter, and the signal amplifier is configured to amplify the detection signal from the bend sensor, and
      a resistor disposed between the positive input terminal and the negative input terminal of the signal amplifier, and the resistor is configured to adjust the detection signal.

* * * * *